US009479232B1

United States Patent
Loui et al.

(10) Patent No.: US 9,479,232 B1
(45) Date of Patent: Oct. 25, 2016

(54) METHOD OF ACHIEVING ULTRA-WIDEBAND TRUE-TIME-DELAY BEAM STEERING FOR ACTIVE ELECTRONICALLY SCANNED ARRAYS

(71) Applicant: Sandia Corporation, Albuquerque, NM (US)

(72) Inventors: Hung Loui, Albuquerque, NM (US); Billy C. Brock, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 14/826,153

(22) Filed: Aug. 13, 2015

(51) Int. Cl.
H04B 7/02 (2006.01)
H04B 7/04 (2006.01)
H04L 27/26 (2006.01)

(52) U.S. Cl.
CPC .......... H04B 7/0408 (2013.01); H04L 27/2646 (2013.01)

(58) Field of Classification Search
CPC ........ H04B 7/04; H04B 7/0408; H01Q 3/22; H01Q 3/2682; H01Q 3/36; H04L 27/2646; H04L 27/26
USPC ......... 455/101, 103; 342/146, 154; 375/260, 375/299, 347, 267, 349; 327/105
See application file for complete search history.

(56) References Cited

U.S. PATENT DOCUMENTS

2002/0175859 A1* 11/2002 Newberg ............ H01Q 3/2682
342/375
2014/0241463 A1* 8/2014 Leenaerts ............ H04B 7/0617
375/299

OTHER PUBLICATIONS

Lievers, et al., "Digital Forming on Transmit and Receive with an AESA FMCW Radar", Proceedings of the 4th European Radar Conference, Oct. 2007, pp. 49-50.
Chappell, et al., "Digital Array Radar Panel Development", IEEE Symposium on Phased Array Systems and Technology (ARRAY), 2010, pp. 50-60.
Lu, et al., "Active Phased Array Antenna Based on DDS", IEEE Symposium on Phased Array Systems and Technology (ARRAY), 2003, pp. 511-516.
Otten, et al., "Light Weight Digital Array SAR", IEEE Symposium on Phased Array Systems and Technology (ARRAY), 2010, pp. 177-182.

(Continued)

*Primary Examiner* — Rahel Guarino
(74) *Attorney, Agent, or Firm* — Medley, Behrens & Lewis, LLC

(57) ABSTRACT

The various embodiments presented herein relate to beam steering an array antenna by modifying intermediate frequency (IF) waveforms prior to conversion to RF signals. For each channel, a direct digital synthesis (DDS) component can be utilized to generate a waveform or modify amplitude, timing and phase of a waveform relative to another waveform, whereby the generation/modification can be performed prior to the IF input port of a mixer on each channel. A local oscillator (LO) signal can be utilized to commonly drive each of the mixers. After conversion at the RF output port of each of the mixers, each RF signal can be transmitted by a respective antenna element in the antenna array. Initiation of transmission of each RF signal can be performed simultaneously at each antenna. The process can be reversed during receive whereby timing, amplitude, and phase of the received can be modified digitally post ADC conversion.

18 Claims, 17 Drawing Sheets

(56) References Cited

OTHER PUBLICATIONS

Litschke, et al., "A 30 GHz Highly Integrated LTCC Antenna Element for Digital Beam Forming Arrays", Antennas and Propagation Society International Symposium, 2005 IEEE (vol. 3B), pp. 297-300.
Simon, et al., "Highly integrated KA-Band Tx Frontend Module Including 8×8 Antenna array", Retrieved at: <<http://www.ieee.li/pdf/viewgraphs/highly_integrated_ka-band_antenna_array.pdf>>, Retrieval Date: Dec. 9, 2014, pp. 1-63.
Dijk, et al, "Multi-Mode FMCW Radar Array with Independent Digital Beam Steering for Transmit and Receive", European Radar Conference (EuRAD), 2008, pp. 412-415.
Brock, B. C., "The Frequency Response of Phased-Array Antennas", Sandia Report SAND88-2667-UC-13, 1989, pp. 1-56.
Frank, et al., "Broadband Phased Array Concepts", Antennas and Propagation Society International Symposium, AP-S Digest (vol. 2), 1994, pp. 1228-1231.

* cited by examiner $m(t-\tau)g(t-\tau) \neq m(t-\tau)g(t)$ $m(t-\tau)g(t-\tau) \neq m(t)g(t-\tau)$

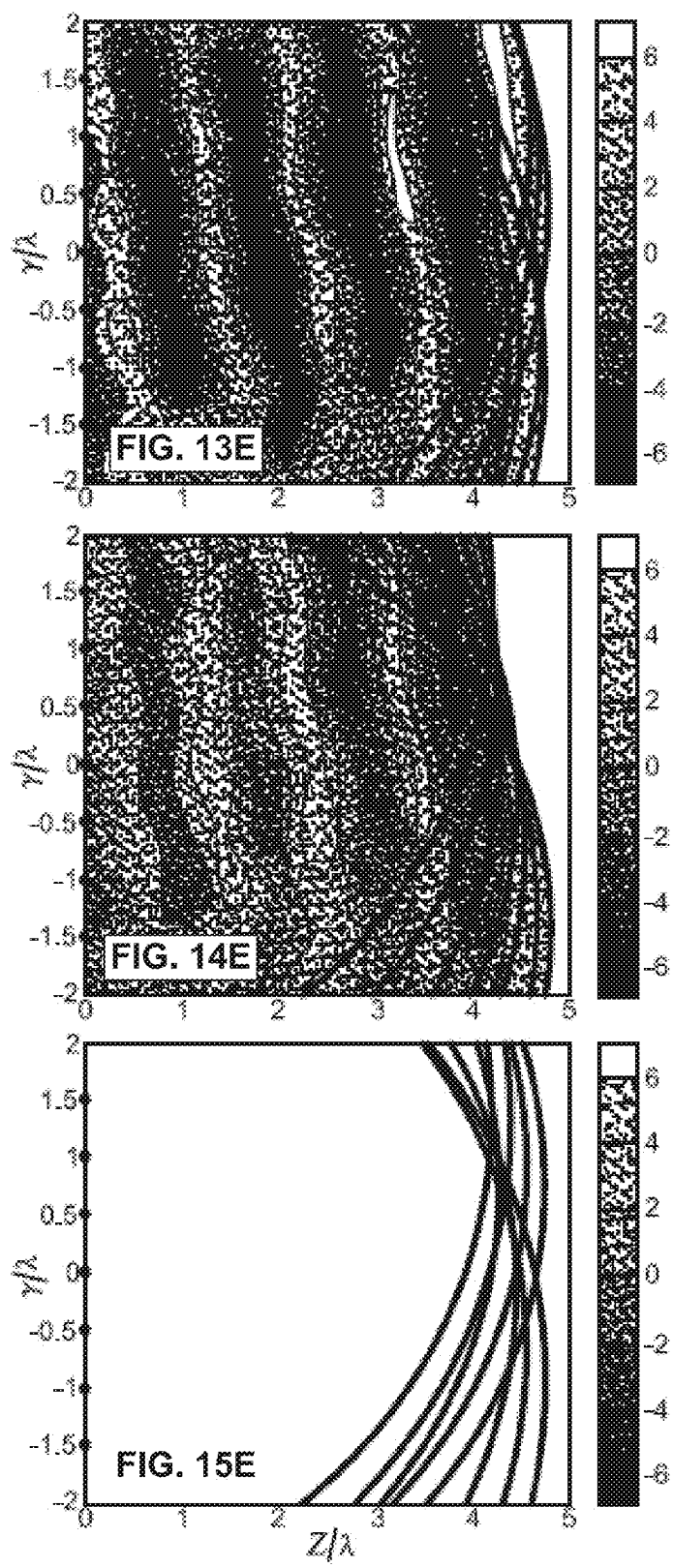

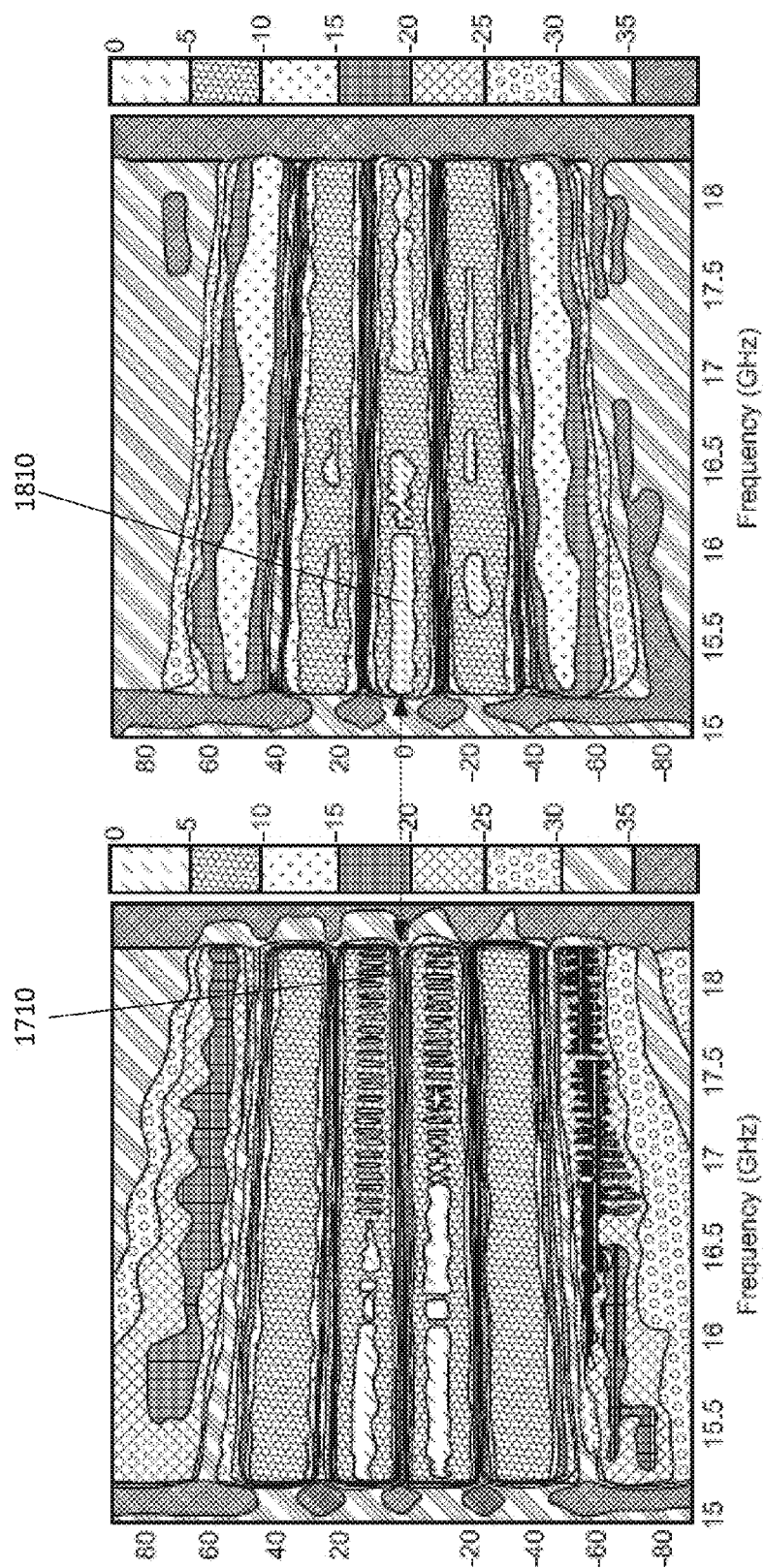

METHOD OF ACHIEVING ULTRA-WIDEBAND TRUE-TIME-DELAY BEAM STEERING FOR ACTIVE ELECTRONICALLY SCANNED ARRAYS

STATEMENT OF GOVERNMENTAL INTEREST

This invention was developed under contract DE-AC04-94AL85000 between Sandia Corporation and the U.S. Department of Energy. The U.S. Government has certain rights in this invention.

BACKGROUND

The concept of an electronically steered array (ESA) has been in existence for many decades. ESAs find application in synthetic aperture radar (SAR), search and tracking radars, and other radars, as well as communication systems. However, the lack of practical, compact, low-loss, broadband, high-resolution, non-modulo-phase shifters (PS) and true-time-delay (TTD) components (or devices) at radio frequencies (RF) continue to limit the capabilities of existing ESAs. Designs can be compromised by limited bandwidth, reduced efficiency, constrained angular coverage, and severe beam deformation while scanning. These difficulties ultimately result in complex sensor structures that can be costly to develop, build, calibrate, and maintain.

SUMMARY

The following is a brief summary of subject matter that is described in greater detail herein. This summary is not intended to be limiting as to the scope of the claims.

Various embodiments are presented herein relating to beam steering an array antenna by modifying an intermediate frequency (IF) signal(s) (or waveform(s)) prior to conversion to RF signal(s). Accordingly, digital components, e.g., having low cost, can be utilized to achieve array antenna beam steering, whereby the beam steering can be achieved with high bandwidth. The antenna array comprises a plurality of antenna elements, each of which is energized by way of a respective channel. Accordingly, the antenna array includes multiple channels. Further, the antenna array comprises mixers respectively positioned on the channels, wherein the mixers are generally configured to convert IF signals to RF signals, and vice-versa.

In an embodiment, an arbitrary waveform generator (AWG) can be utilized to generate a plurality of IF signals. The AWG can utilize direct digital synthesis (DDS) during generation of each of the IF signals in the plurality of IF signals. Accordingly, DDS can facilitate generation of a first IF signal having a different configuration to a second IF signal, wherein the different configurations can include at least one of amplitude, timing ($\tau$), and/or phase ($\Phi$) of the first IF being different to the amplitude magnitude, the timing, and/or the phase of the second IF waveform. During generation of IF signals at the AWG, the amplitude, timing and phase can be considered to be components of the generated waveform(s), whereby the components are configured in accordance with one or more parameters defined in the DDS. The AWG can be located prior to at least one mixer, wherein the at least one mixer converts (e.g., frequency-converts) the first IF waveform and the second IF waveform to, respectively, a first RF signal and a second RF signal.

In another embodiment, signal transmission and signal waveform shape can be modified on an IF portion of a channel, e.g., at the IF input port of a mixer and prior to conversion to an RF signal. For each channel in the array antenna, a DDS component or an AWG can modify/synthesize an amplitude, timing, and/or phase of an IF waveform relative to another IF waveform (and, accordingly, the resulting RF waveforms). Each DDS component can include a time component (e.g., a TTD component), an amplitude component (e.g., a programmable attenuator or an variable-gain amplifier) and a phase component (e.g., a PS or a constant phase shift (CPS) component), which can respectively modify the amplitude, timing or the phase of an IF waveform.

By generating IF signals with a particular amplitude, phase, or timing, or by modifying an amplitude, a phase, or a timing of IF signals (rather than phase shifting or time shifting signals already in the RF domain), the array antenna can be configured to perform beam steering on both transmit and receive utilizing inexpensive componentry. Furthermore, amplitude modifications at IF may be used to compensate for distortions introduced by IF and RF circuitry.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIGS. 13A-E are images of wavefront formation for TTD simultaneous turn-on for a plurality of timings $\tau$.

FIGS. 14A-E are images of wavefront formation for TTD sequential turn-on for a plurality of timings $\tau$.

FIGS. 15A-E are images of differences in wavefront formation between TTD simultaneous turn-on and TTD sequential turn-on for a plurality of timings τ.

FIG. 17 is a normalized RF antenna array pattern for mono-pulse (tracking) mode.

FIG. 18 is a normalized RF antenna array pattern for imaging mode.

DETAILED DESCRIPTION

Figure 1:
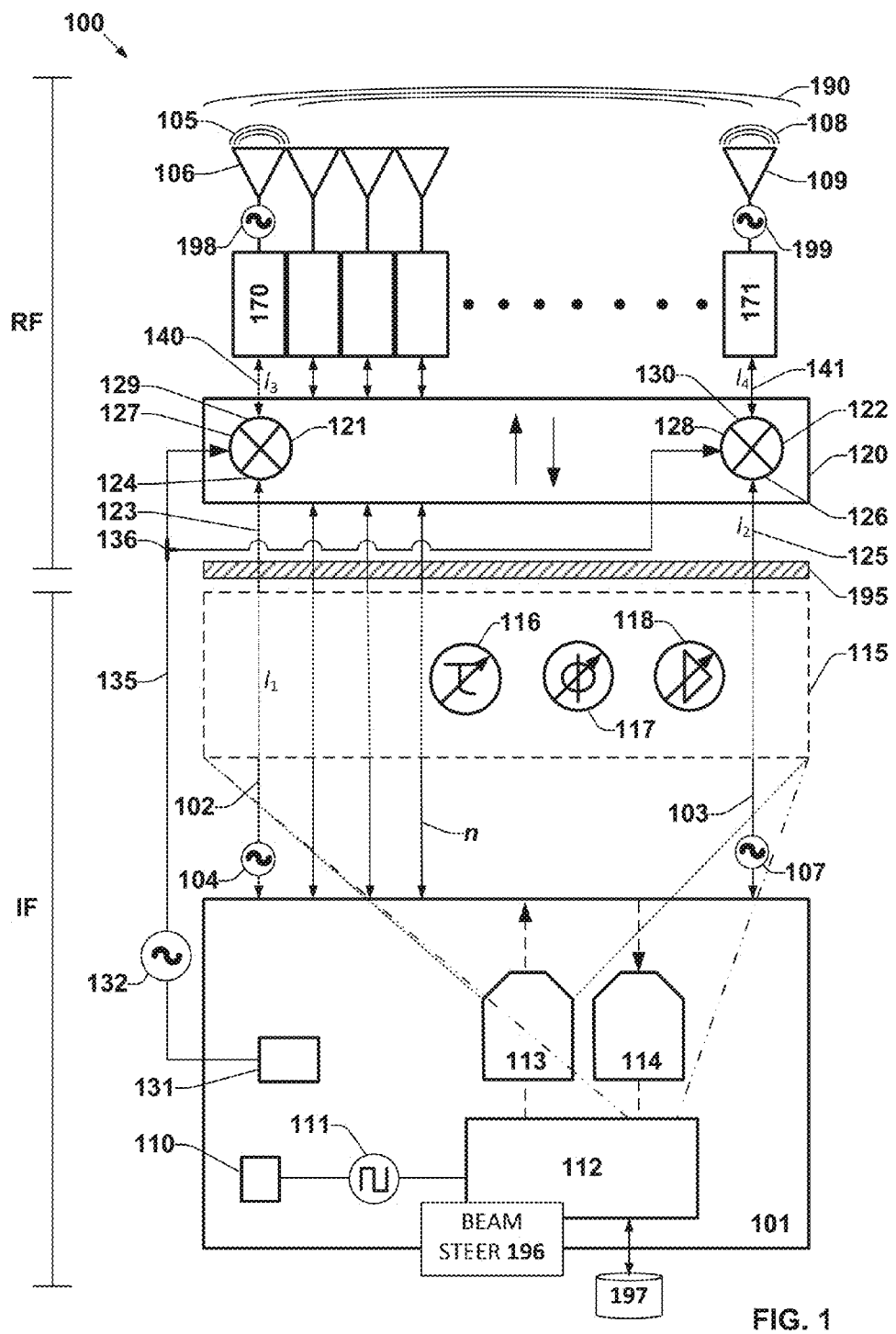
FIG. 1 illustrates an exemplary system for modifying intermediate frequency (IF) waveforms prior to conversion to RF signals.

Various technologies pertaining to beam steering an array antenna by generating and/or modifying intermediate frequency (IF) waveforms prior to conversion to radio frequency (RF) signals are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Further, the term "or" is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something, and is not intended to indicate a preference.

In the following description, the intermediate frequency will be referenced as lower than the RF, requiring up-conversion to RF. However, it is to be appreciated that a higher IF can be combined with down-conversion to a lower RF to achieve beam steering, or other application that can benefit from signal conversion in the IF and RF domain.

As previously mentioned, beam steering at RF using expensive and subpar PS and/or TTD components (or devices) can be prohibitively expensive to achieve desired bandwidth, efficiency, angular coverage, etc. The various embodiments presented herein are directed towards achieving beam steering by performing operations at IF prior to conversion to RF for radiation. Performing PS and/or TTD at IF is favorable from a component selection perspective, particularly when commercial direct digital synthesis (DDS) components (e.g., integrated circuits or chips) are readily available that meet Shannon's sampling criterion, whereby such DDS components can be manufactured to include TTD and PS components, e.g., with arbitrary amplitude.

To aid readability, the terms "signal" and "waveform" are used interchangeably herein, whereby a signal (or pulse) can have a particular waveform, and a waveform can identify a shape construct of a signal.

FIG. 1 illustrates a system 100, e.g., an array antenna, configured to enable broadband TTD electronic beam steering on transmit and receive by generating IF signals having one or more delayed components via digital signal processing. System 100 illustrated in FIG. 1 comprises a plurality of channels and included components to enable signaling from a signal module 101. As shown, the signal module 101 can generate signals for transmission (and reception) over a plurality of channels and antenna elements. Channels 102 and 103 are discussed herein, however the described components and methodologies related thereto are applicable to all of the n channels which can form an array antenna (where n is a integer greater than zero).

The signal module 101 can generate a first signal (having a first waveform) 104 on the first channel 102, whereby the first signal 104 is generated, processed, and/or modified by various components included in the first channel 102, and finally is transmitted as a first emitted signal 105 at the antenna element 106. Further, the signal module 101 can generate a second signal (having a second waveform) 107 on the second channel 103, whereby the second signal 107 is generated, processed, and/or modified by various components included in the second channel 103, and finally is transmitted as a second emitted signal 108 at the antenna element 109. The emitted signals 105 and 108, and a plurality of signals generated by the other n channels (not shown), can combine to form a steerable beam 190. The first signal 105 and the second signal 107 can be emitted with required true time delay for ultra-wide-band beam steering.

The signal module 101 includes a digital source 110, which can generate a digital signal 111. The signal module 101 can further include a processor/controller 112 (hereinafter controller 112), whereby the controller 112 can control generation and/or modification of signals at the signal module 101, and further, process signals received at the signal module 101.

The signal module 101 can further include a waveform generator 113 (e.g., an arbitrary waveform generator (AWG)). The AWG 113 can be utilized to receive a digital signal 111 (e.g., for each of the channels 102, 103, n), and in accordance with one or more embodiments presented herein, the AWG 113 can convert each digital signal 111 into a respective analog signal, e.g., generate signals 104 and 107 both having an analog format. In an embodiment, the AWG 113 can comprise of one or more digital to analog convertors (DACs).

The AWG 113 and the controller 112 can operate in conjunction with a DDS component 115. As shown, the DDS component 115 can include a time (τ) component 116 (e.g., a TTD component), a phase (Φ) component 117 (e.g., a PS or a constant phase shift (CPS) component), and an amplitude component 118.

In an embodiment, the time component 116, the phase component 117, and the amplitude component 118 can be physical components, e.g., the time component 116 can be a time shifter, the phase component 117 can be a phase shifter, and the amplitude component 118 can be an attenuator. Hence, a digital signal 111 can be processed at one or more of the time component 116, the phase component 117, and/or the amplitude component 118.

In another embodiment, the DDS component 115 can be a virtual component, e.g., an algorithm, settings, instructions, etc., which can be utilized to control conversion of a plurality of signals (e.g., signals 104 and 107) from digital format (e.g., digital signal 111) to analog format. During the signal conversion, at least one of the timing, phase and/or amplitude can be configured such that the generated analog signal (e.g., signal 104 and/or signal 107) can be generated with a desired timing, phase and/or amplitude, as further described herein.

As further shown in FIG. 1, system 100 can further include a conversion module 120 which can be utilized to convert signals having an intermediate frequency (IF) to a radio frequency (RF) and vice versa, as required to enable signal transmission and reception. To enable signal conversion, the conversion module 120 can include one or more mixers, e.g., mixers 121 and 122. The conversion module 120 is not necessary if the T/R modules and antennas can directly operate at IF frequencies, i.e., where the IF is the RF.

Hence, a first portion of the circuitry of channel 102 between the signal module 101 and the conversion module 120 comprises a first IF portion 123, which connects the channel 102 from the signal module 101 to an IF input port 124 of a first mixer 121. Further, the channel 103 includes a second IF portion 125 which is connected to an IF input port 126 of the second mixer 122. A connector 195 can be utilized to enable connection of the IF portion of system 100 to an RF portion of system 100, thereby enabling a "plug and play" approach to incorporation of the IF portion of system 100 to the RF portion of system 100.

A local oscillator 131 is connected to the mixers 121 and 122, respectively by LO input port 127 and an LO input port 128, whereby an oscillator signal 132 generated by the LO 131 can be configured to modify the respective signals 104 and 107 in their IF form to RF form. The oscillator signal 132 can be a carrier signal, such as a sinusoidal continuous wave signal, a square wave signal, etc. The LO 131 can be connected to the LO input ports 127 and 128 via a circuit 135 and power divider 136, whereby circuit 135 can be a corporate-fed circuit. While not shown in FIG. 1, the circuit 135 can be connected to n other mixers included in the conversion module 120, whereby the n other mixers form part of the n channels connected to the signal module 101.

The channels 102 and 103 further include respective RF portions 140 and 141, which are coupled to the respective mixers 121 and 122. The RF portion 140 can be connected to an RF output port 129 of the mixer 121, and the RF portion 141 can be connected to an RF output port 130 of the mixer 122. The IF portions 123 and 125, and the RF portions 140 and 141 can be transmission lines having respective lengths $l_1$, $l_2$, $l_3$ and $l_4$.

The mixers 121 and 122 enable respective signals 104 and 107 having an intermediate frequency at the IF input ports 124 and 126 to be converted to RF frequencies for transmission as emitted signals 105 and 108, whereby conversion from an IF to a RF can be in accordance (e.g., mixed) with the oscillator signal 132. Transmission of the first signal 104 in RF form on channel 102 is via the antenna 106, while transmission of the second signal 107 in RF form on channel 103 is via the antenna 109.

Furthermore, respective transmit and receive (T/R) modules 170 and 171 can be located between respective mixer and antenna pairings, e.g., between mixer 121 and antenna 106, and between mixer 122 and antenna 109.

As previously mentioned, operation of the DDS component 115 can be controlled in accordance with a controller 112. The controller 112 can include a beam steering algorithm 196. Accordingly, when the DDS component 115 is a virtual component, the controller 112 can utilize the DDS component 115 to configure respective values for at least one of a time delay (e.g., the time component 116), a phase (e.g., the phase component 117), and/or an amplitude (e.g., the amplitude component 118) for a waveform generated on each of the channels 102, 103, n, etc. For example, during conversion of an initial digital signal 111 to either of the signals 104 and/or 107 in their IF format, the DDS component 115 can be virtually applied at the AWG 113, such that each waveform has the desired time delay, phase shift, amplitude, etc., to achieve one or more signaling parameters defined in the beam steering algorithm 196.

System 100 can further include a data store 197. The controller 112 can access the data store 197 to enable storage and retrieval of one or more parameters and/or values (e.g., beam steering parameters, characteristics of various components and circuitry forming system 100, etc.) to enable beam steering (e.g., in accordance with the beam steering algorithm 196).

The signal module 101 can further include an analog to digital convertor (ADC) 114 to convert received analog signals to a digital format. A signal (e.g., an echo signal or pulse 198 and/or 199) can be received on any of the antennas (e.g., antenna 106 and/or 109) and subsequent to downconversion at the respective mixer (e.g., mixer 121 or 122) and conversion from analog to digital format (e.g., at the ADC 114), the received pulse 198 and/or 199 can undergo processing at the controller 112, whereby the controller 112 can operate in conjunction with the DDS component 115 and/or the beam steering algorithm 196. Accordingly, the received signal 198 and/or 199 can be processed in accordance with any conditions applied to the one or more signals 104 and 107 during generation of the signals 104 and 107.

In an embodiment, as previously mentioned, the AWG 113 can perform DDS using high-speed multi-channel DACs. Accordingly, during signal transmission, as shown by the dashed box, the DDS 115 can perform amplitude change, phase shifting and/or time delay. While on signal receive, the controller 112 after the ADC 114 can perform the same amplitude change, phase shifting and/or time delay processing utilizing the DDS 115.

As previously mentioned, the DDS component 115 can be either a standalone component (or a plurality of components 116, 117, and 118), or the DDS component 115 can be incorporated into another component. For example, the DDS component 115 can be incorporated into a digital signal processor (DSP) (not shown). Such a DSP can be a digital to analog (D/A) convertor (not shown), which can perform any required signal conversion.

Further, in an embodiment, the DDS component 115 can be operated at a sub-array level rather than at the antenna level of system 100.

The various embodiments presented herein can be directed towards any suitable frequencies and/or frequency ranges. For example, signal module 101 can generate the signals 104 and 107 with baseband frequency bandwidth of about 3 GHz. The signals 104 and 107 can have an IF of about 0.4 GHz to about 3.4 GHz. Further, the signals 104 and 107 can be up-converted to RF at X-band, K, Ku, Ka, etc., by varying the frequency of 132. The various embodiments presented herein can also be utilized with the visible portion of the electromagnetic spectrum, e.g., frequencies from about 0 Hz up to about 790 THz.

Further, RF beam shaping, e.g., amplitude tapered aperture, can be accomplished by amplitude tapering the IF signal (e.g., signals 104 and/or 107) prior to conversion for transmission (e.g., up-conversion at mixers 121 and 122) or after conversion for reception (e.g., down-conversion at mixers 121 and 122). Amplitude control of the IF channels also makes possible multi-channel amplitude equalization, wherein amplitude equalization can be a calibration step in addition to phase and delay calibration.

To facilitate understanding of how the various embodiments presented herein can be utilized to achieve broadband TTD beam steering using DDS on a signal while having an IF waveform, without utilizing any TTD components on the signal while having a RF waveform, an overview of the advantages of and differences between TTD and CPS for beam steering are presented. In an aspect, for CPS, even if perfect phase shifters were available, beam pointing error and distortion is still a function of signal bandwidth and element spacing; while TTD does not suffer from such limitations.

To further elaborate, the most general form of an array factor of N antenna elements arbitrarily located in space at $\vec{r}_n$ (e.g., $n^{th}$ vector from the origin to the element location) excited with amplitude $\alpha_n$ and phase $\Phi_n$ at the observing direction of $\hat{r}$ is given by the expression:

$$AF = \sum_{n=1}^{N} \alpha_n e^{j\Phi_n} e^{-jk\vec{r}_n \cdot \hat{r}}, \quad \text{Eqn. 1}$$

where $k=2\pi f/c_0$, and $\hat{r}=\sin\theta\cos\Phi\hat{x}+\sin\theta\sin\Phi\hat{y}+\cos\theta\hat{z}$ in rectangular coordinates; $c_0$ is the speed of light in vacuum. With $\Phi_n=+k_n\vec{r}_n*\hat{r}_0=k\vec{r}_n\cdot\hat{r}_0$, where $\hat{r}_0=\sin\theta_0\cos\Phi_0\hat{x}+\sin\theta_0\sin\Phi_0\hat{y}+\cos\theta_0\hat{z}$, the above sum would produce a maximum in the direction $\theta_0$ and $\Phi_0$. Hence, by changing $\Phi_n=-k_n\vec{r}_n\cdot\hat{r}_0$, it is possible to steer a beam to $\theta_0$ and $\Phi_0$. The main difference between TTD and CPS is the manner at which $k_n$ in $\Phi_n$ is generated. In the case of TTD, $k_n=k=2\pi f/c_0$ whereas in CPS $k_n=2\pi f_0/c_0$. Here, $f_0$ is typically selected to be at the band center. Thus, from the foregoing:

$$\sum_{n=1}^{N}\alpha_n e^{j2\pi f/c_0 \vec{r}_n \cdot \hat{r}_0}e^{-jk\vec{r}_n \cdot \hat{r}} \neq \sum_{n=1}^{N}\alpha_n e^{j2\pi f_0/c_0 \vec{r}_n \cdot \hat{r}_0}e^{-jk\vec{r}_n \cdot \hat{r}}, \quad \text{Eqn. 2}$$

except for when $f=f_0$. It is possible to force the issue and make the two maximums equal to each other by changing $\hat{r}_0 \rightarrow \hat{r}'_0$ in the CPS expression at $f \neq f_0$. The resulting difference between $\hat{r}_0$ and $\hat{r}'_0$ is known as beam-pointing error. An estimate of this beam pointing error as a function of frequency change for an equal path feed array is given by:

$$\Delta\theta_0 = -\frac{\Delta f}{f_0}\tan\theta_0 \quad \text{Eqn. 3}$$

From the foregoing, it is evident that CPS beam-pointing error is large at higher scan angles and wider signal bandwidths. Conversely, the absence of beam pointing error over large signal bandwidth and direction can be utilized to validate (e.g., experimentally) the occurrence of TTD. Another consideration from the above equations is the inability of CPS to steer to certain $\hat{r}_0$ due to phase wrapping. If $$\phi_n = \frac{2\pi f_0}{c_0}\vec{r}_n \cdot \hat{r}_0 > m_n 2\pi$$

(whereby $m_n$ is an integer) then a new direction of maximum $\hat{r}'_0$ exists such that $$\vec{r}_n \cdot \vec{r}'_0 = \vec{r}_n \cdot \vec{r}_0 - m_n \frac{c_0}{f_0}.$$

This occurs for $$|\vec{r}_n| > \frac{m_n}{\hat{r}_n \cdot \hat{r}_0}\lambda_0,$$

where $$\lambda_0 = \frac{c_0}{f_0}$$

is the free-space wavelength. By purposely setting the spacing between elements to $$|\vec{r}_n| > \frac{\lambda_0}{\hat{r}_n \cdot \hat{r}'_0},$$

the inability of CPS to steer to directions where the phase required is greater than $2\pi$ can be ascertained (e.g., experimentally). TTD does not suffer from such issues, because any phase wrapping in $\Phi_n$ is precisely canceled out by the same phase wrapping in the free-space phase propagator $e^{jk\vec{r}_n \cdot \hat{r}}$.

Digital waveforms are capable of synthesizing delay with a time-domain resolution less than the inverse of its sampling rate, i.e.

$$\tau_{eff} < \left(\frac{1}{f_s} = \Delta t\right).$$

This relationship enables beam steering to be realized because a time delay required for a typical array with $\lambda/2$-spaced adjacent radiators is on the order of $$\tau = \frac{\sin\theta}{2f};$$

where, $\theta$ is the steering angle from a boresight (e.g., as indicated in FIG. 1) and $$f = \frac{c_0}{\lambda},$$

the operating frequency. For small steering angles, $\tau \ll \Delta t$ even if $f_s=2f$. Hence, beam angle resolution requires time delays that are accurate to a sub-clock cycle. Although this problem may be solved by increasing $f_s \gg f$, it is neither feasible nor physically practical at frequencies beyond X-band.

Effective delay may be made to be smaller than available from a quantized clock if the amplitude of a digital signal is taken into consideration. An exemplary N-bit digital-to-analog convertor (DAC) can have a magnitude resolution of $$\Delta R = \frac{A}{2^N - 1},$$

where A is its maximum range. Accordingly, two non-quantized, but sampled, digital signals can be considered:

$$g_1(n\Delta t) = \frac{A}{2}\cos[2\pi f n\Delta t] \qquad \text{Eqn. 4}$$

$$g_2(n\Delta t) = g_1(n\Delta t - \tau) = \frac{A}{2}\cos[2\pi f(n\Delta t - \tau)], \qquad \text{Eqn. 5}$$

where, $\omega = 2\pi f$. These two functions are indistinguishable from each other if the magnitude of their difference is less than half of the magnitude resolution of the DAC for all n samples. Conversely, the two signals are distinguishable if the magnitude of their difference $(\Delta g = |g_1 - g_2|) > 0.5\Delta R$. It is readily apparent that the smallest $\tau$ for which this is true is given by:

$$\tau_{min} > \frac{\sin^{-1}\left(\frac{1}{2^N-1}\right)}{2\pi f} \approx \frac{\Delta R}{2\pi f A}. \qquad \text{Eqn. 6}$$

Although the above expression implies that increasing the DAC resolution or the frequency of operation lowers the minimum representable delay $\tau_{min}$; it does not say anything about the signal quality (distortion, delay error, etc. . . . ) due to the quantization of $g_2$. Although frequency components due to quantization can be filtered at the DAC output, any quantitative quality measure of how much distortion or delay error is tolerable can be application dependent. For example, a possible conclusion can be made that if a quantized version of the undelayed signal is tolerable then the corresponding quantized version of the delayed signal is too. However, such a conclusion is false for purposes of beam steering, if the effective delay is not produced accurately at elemental spatial locations as a result of coarse quantization.

Accordingly, let $\langle g_1 \rangle$ and $\langle g_2 \rangle$ be the quantized versions $g_1$ and $g_2$, respectively. The fidelity with which $\langle g_2 \rangle$ represents $g_2$, a delayed version of $g_1$, can possibly be found by comparing the phase differences (which contain information about $\tau$) between their Fourier transforms $\langle G_2 \rangle$ and $G_2$.

Turning to FIGS. 2-11, a plurality of schematic representations are presented to illustrate utilization of CPS and TTD at an IF signal portion of a radar generation system to delay a subsequently produced RF signal portion of the radar generation system. Each of the schematics in FIGS. 2-11 illustrate a single channel and various effects (e.g., comparability or non-comparability of configurations) which can be engendered based upon respective phase modification(s) and timing modification(s) on particular circuit configurations 200-1100. While FIGS. 2-11 are schematics, various components illustrated in FIGS. 2-11 are comparable to components presented in system 100. Further, to enhance readability, the common components in configurations 200-1100 are numbered in FIG. 2. However, the common components and numbering are carried across all of the configurations 200-1100. As shown in configuration 200, the common components are a waveform 204 (e.g., comparable to waveforms 104 and 107), transmitted in an IF form 210 (e.g., comparable to IF portions 123 or 125) to an IF input port 221 of a mixer 220 (e.g., comparable to mixers 121, 122), whereby the IF input port 221 is comparable to IF input ports 124, 126. A LO input port 222 of the mixer 220 is connected to a LO 230 (e.g., comparable to LO 131), whereby the LO input port 222 is comparable to LO input ports 127, 128. As previously mentioned, the waveform 204 can undergo conversion based upon an oscillator signal 231 (e.g., comparable to oscillator signal 132) from the LO 230, whereby the up-converted waveform generated at the mixer 220 can be transmitted from the mixer 220 at a RF output port 223 to the RF portion 240 (e.g., comparable to RF channel portions 140, 141). The RF output port 223 is comparable to the RF output ports 129, 130. The waveform 204 in RF form can be transmitted from antenna 206 (e.g., comparable to antenna elements 106, 109) as a signal 205 (e.g., comparable to signals 105, 108) which can be combined with other signals to form a steerable beam (not shown, but comparable to beam 190).

Figure 2:
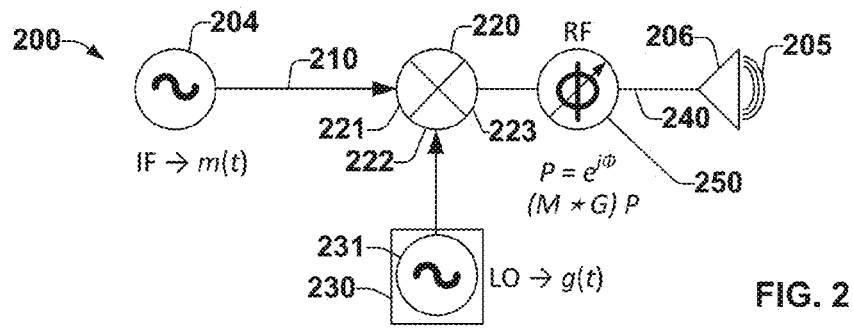
FIG. 2 presents a schematic of phase shifting on a RF portion of a channel.
Figure 3:
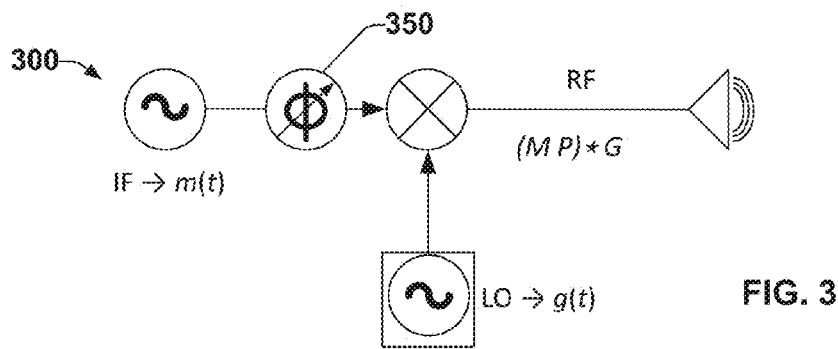
FIG. 3 presents a schematic of phase shifting on an IF portion of a channel.
Figure 4:
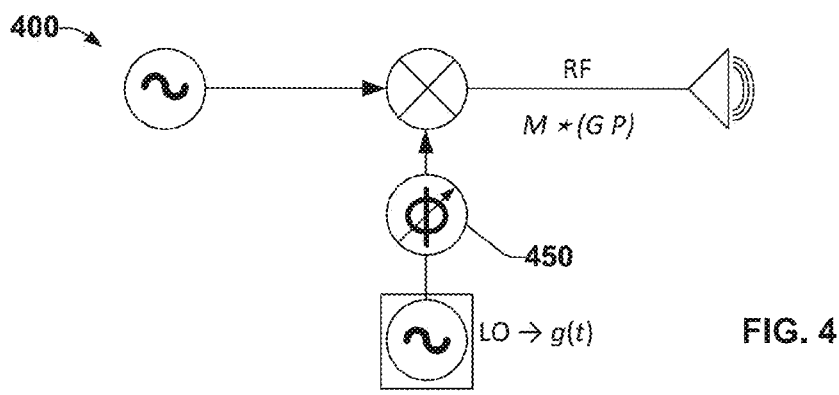
FIG. 4 presents a schematic of phase shifting on a LO channel.
Figure 5:
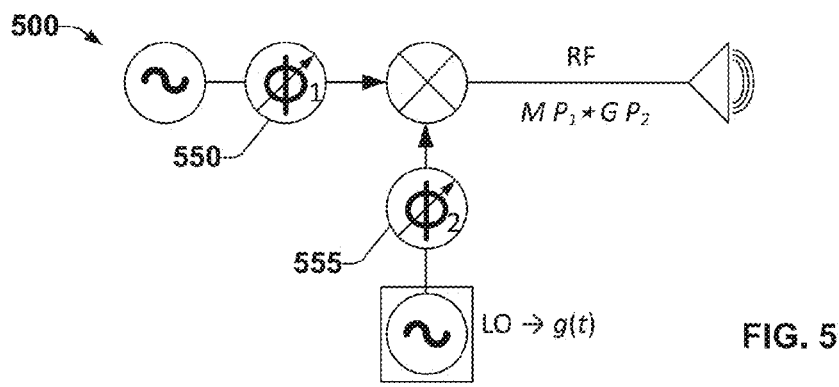
FIG. 5 presents a schematic of phase shifting on an IF portion of a channel in combination with phase shifting on a LO portion of the channel.

FIGS. 2-4 indicate that applying CPS 250 at the RF output port 223 of the mixer 220 (FIG. 2) is the same as applying CPS 350 at the IF input port 221 of the mixer 220 (FIG. 3), which is also the same as applying CPS 450 to the LO input port 222 of the mixer 220 (FIG. 4). Further CPS can be applied in partial combination, whereby a first CPS portion 550 at the IF input port 221 and a second CPS portion 555 at the LO input port 222 (FIG. 5) of the mixer 220 can be utilized, and the configuration 500 has the same result as the respective application of CPS in configurations 200, 300, and 400. Defining the modulation function of the waveform 204 in IF form 210 to be m(t) and the modulation function of the oscillator signal 231 to be g(t), their respective frequency-domain representations are M(f) and G(f). Multiplication in the time-domain by the mixer 220 is the same as convolution ($\star$) in the frequency domain, therefore:

$$(M \star G)P = (\int_{-\infty}^{\infty} M(v)G(v-f)dv)P \qquad \text{Eqn. 7}$$

Further, the CPS function $P = e^{j\Phi}$ may be brought inside of the integral in any order owing to it being a complex constant, which results in the convolution identities:

$$(M \star P)P = (MP) \star G = M \star (GP), \qquad \text{Eqn. 8}$$

as respectively identified in FIGS. 2-4. Further, if $P = P_1 P_2$ by letting $\Phi = \Phi_1 + \Phi_2$, then $(M \star G)P = MP_1 \star GP_2$, as identified in FIG. 5. Since the RF signals (e.g., in the RF portion 240) of various configurations presented in FIGS. 2-5 are equivalent in the frequency domain, their respective time domain representations, following an inverse Fourier transform, are also identical. Hence, it makes little difference to the connected antenna 206 where CPS is applied to a configuration, apart from any impedance mismatch variation that may arise.

The foregoing presented with regard to FIGS. 2-5 illustrates that if CPS is desired at each antenna element, then it may be produced at IF rather than RF, as shown in FIG. 3.

As previously mentioned, by performing signal modification in the IF, cheap, reliable, and scalable digital synthesis devices can me employed.

Accordingly, with reference to the application of CPS in the IF domain, a determination of whether the equivalency presented in FIGS. 2-5 for the CPS is also true for TTD modification is undertaken in FIGS. 6-9. FIGS. 6-9 present a plurality of schematic representations, whereby the CPS components (e.g., CPS components 250, 350, 450, 550 and 555) of FIGS. 2-5 are replaced with ideal TTD components.

Figure 6:
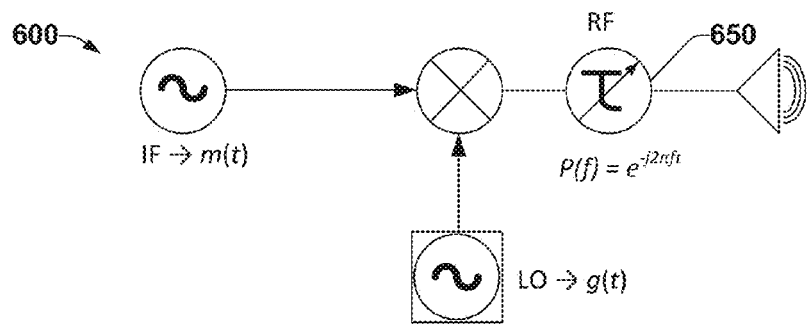
FIG. 6 presents a schematic of time delay on a RF portion of a channel.
Figure 7:
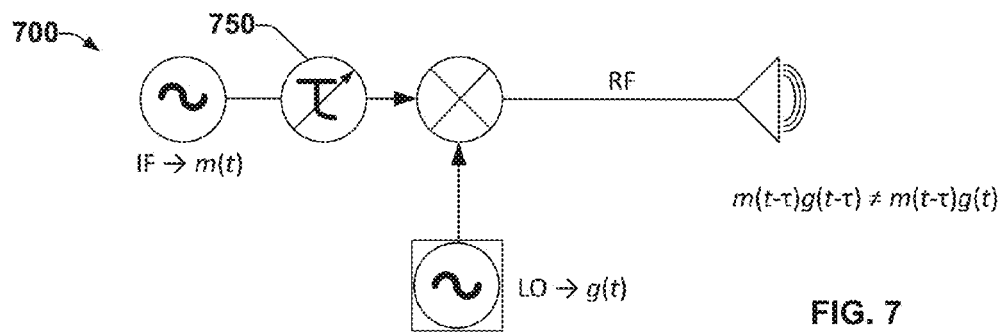
FIG. 7 presents a schematic of time delay on an IF portion of a channel.
Figure 8:
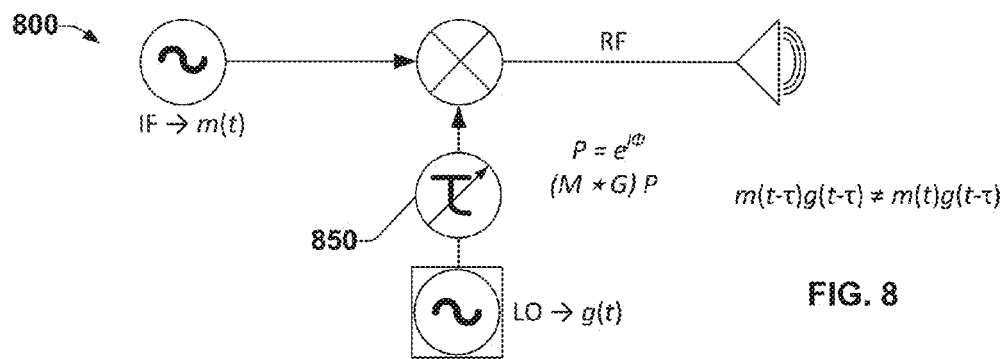
FIG. 8 presents a schematic of time delay on a LO channel.
Figure 9:
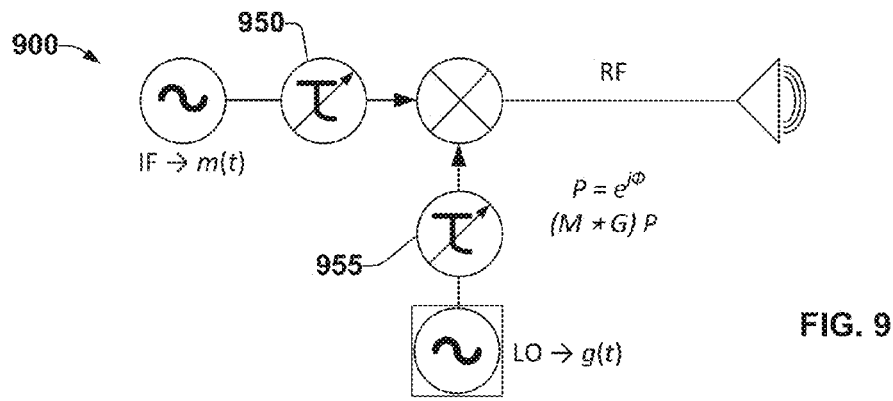
FIG. 9 presents a schematic of time delaying on an IF portion of a channel in combination with time delaying on a LO portion of the channel.

FIG. 6 illustrates a TTD component 650 located on the RF portion 240 (e.g., at the RF output port 223), while FIG. 7 illustrates a TTD component 750 on the IF portion 210 (e.g., at the IF input port 221). FIG. 8 illustrates a TTD component 850 located on the LO signaling portion 231 (e.g., at the LO input port 222). FIG. 9 illustrates a first TTD component 950 on the IF portion 210 (e.g., at the IF input port 221), and a second TTD component 955 on the LO signaling portion 231 (e.g., at the LO input port 222).

In the frequency domain, $P(f)=e^{j\Phi(f)}=e^{-j2\pi f\tau}$ is no longer a constant, and hence, it is possible to conclude that:

$$(M\star G)P\neq(MP)\star G\neq M\star(GP),\qquad\text{Eqn. 9}$$

and accordingly, the configurations 600 and 700 presented in FIGS. 6-7 cannot be considered to be equivalent. This is evident if the respective signals are examined in the time domain. Let $q(t)=m(t)g(t)$, then for the desired configuration 600 illustrated in FIG. 6, the output at the RF output port 223 is $q(t-\tau)=m(t-\tau)g(t-\tau)$. The result of FIG. 6 matches the configuration 900 presented in FIG. 9 but does not match the configurations 700 and 800 respectively presented in FIGS. 7 and 8. Hence, in comparison with FIGS. 2-5, applying TTD at the RF output port 223 of the mixer 220 (per FIG. 6) alone is not the same as applying TTD at the IF input port 221 of the mixer 220 (per FIG. 7) alone, or to the LO input port 222 (per FIG. 8) of the mixer 220 alone, but rather equivalence is found in the configuration 900 comprising the combination of the first TTD component 950 on the IF input port 221, and the second TTD component 955 on the LO input port 222. The foregoing indicates that a solution of not utilizing RF components in a configuration cannot be achieved because TTD of a oscillator signal 231 requires a high-frequency RF component(s), e.g., configuration 900 can be costly and inefficient. Furthermore, equivalence can require the delay imposed by the TTD component 955 to be indistinguishable from that imposed by the TTD component 950.

Figure 10:
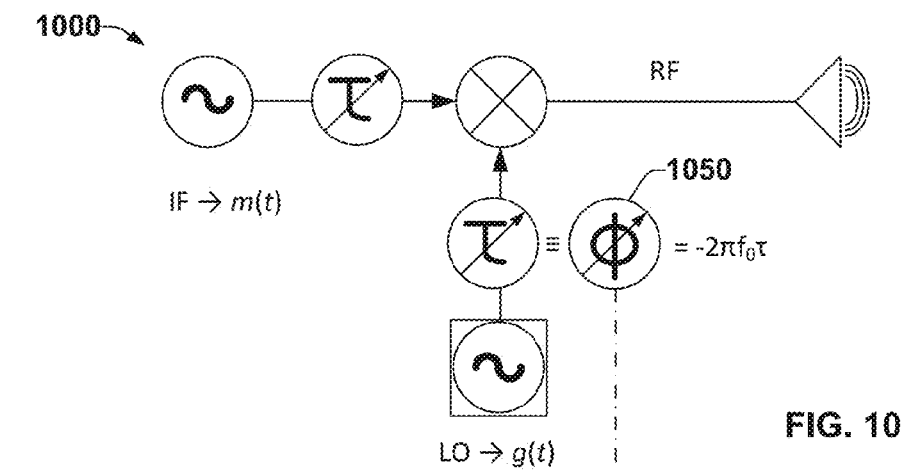
FIG. 10 presents a schematic of time delaying on a LO circuit having equivalence to phase shift on the LO circuit at the LO frequency of $f_0$ in combination with time delaying on an IF portion of a channel.
Figure 11:
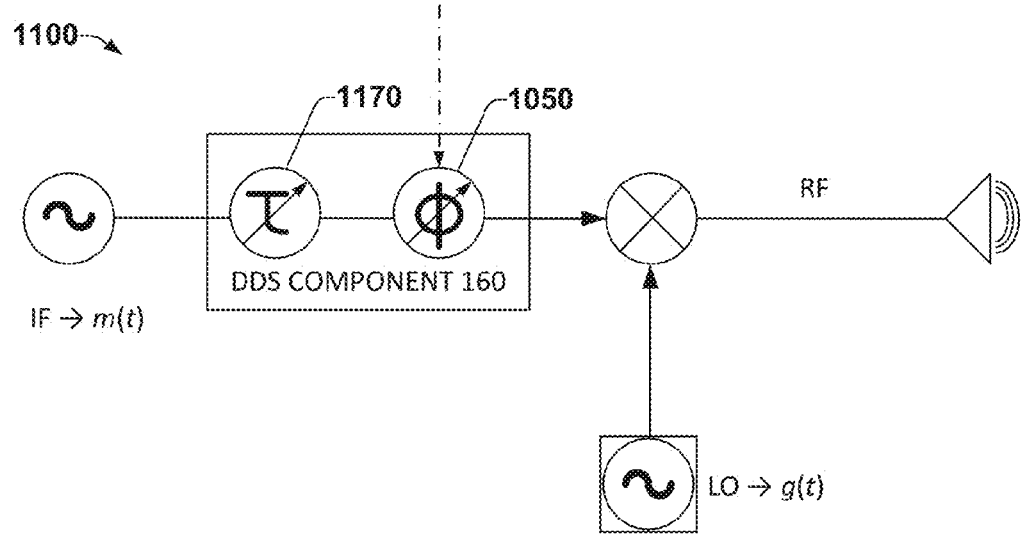
FIG. 11 presents a schematic of a combination of time delay and phase shift from FIG. 10 on an IF portion of a channel.

However, the oscillator signal 231 (and oscillator signal 132) for numerous radar systems is a single-tone carrier signal at $f_0$. Time delay at a single frequency is the same as constant phase shift, i.e. $g(t-\tau)=e^{-j2\pi f_0\tau}g(t)$. Accordingly, CPS may be moved from any port (e.g., any of ports 221, 222, 223) of the mixer 220 to any other port as illustrated in the configurations presented in FIGS. 2-5. Hence, owing to the equivalency of time delay and constant phase shift at a single frequency, as shown in FIGS. 10 and 11, the CPS 1050 of the oscillator signal 231 (e.g., configuration 1000) can be moved to the IF input port 221 of the mixer 220 (e.g., configuration 1100), as indicated by the broken line between FIGS. 10 and 11. Accordingly, a DDS component 160 can be applied at an IF input port of a mixer (e.g., any of mixers 121, 122, 220), whereby the DDS component 160 can comprise a time component (e.g., any of time components 116, 1170) and a phase component (e.g., any of phase components 117, 1050), whereby a time component can perform TTD and a phase component can perform CPS. Thus, per the foregoing, it is apparent that TTD on an RF portion (e.g., any of RF portions 140, 141, or 240 from any of RF output ports 129, 130, or 223) of a channel can be achieved at the IF portion (e.g., at any of IF input ports 124, 126, or 221) of the channel without requiring utilization of any RF TTD or PS components.

Figure 12:
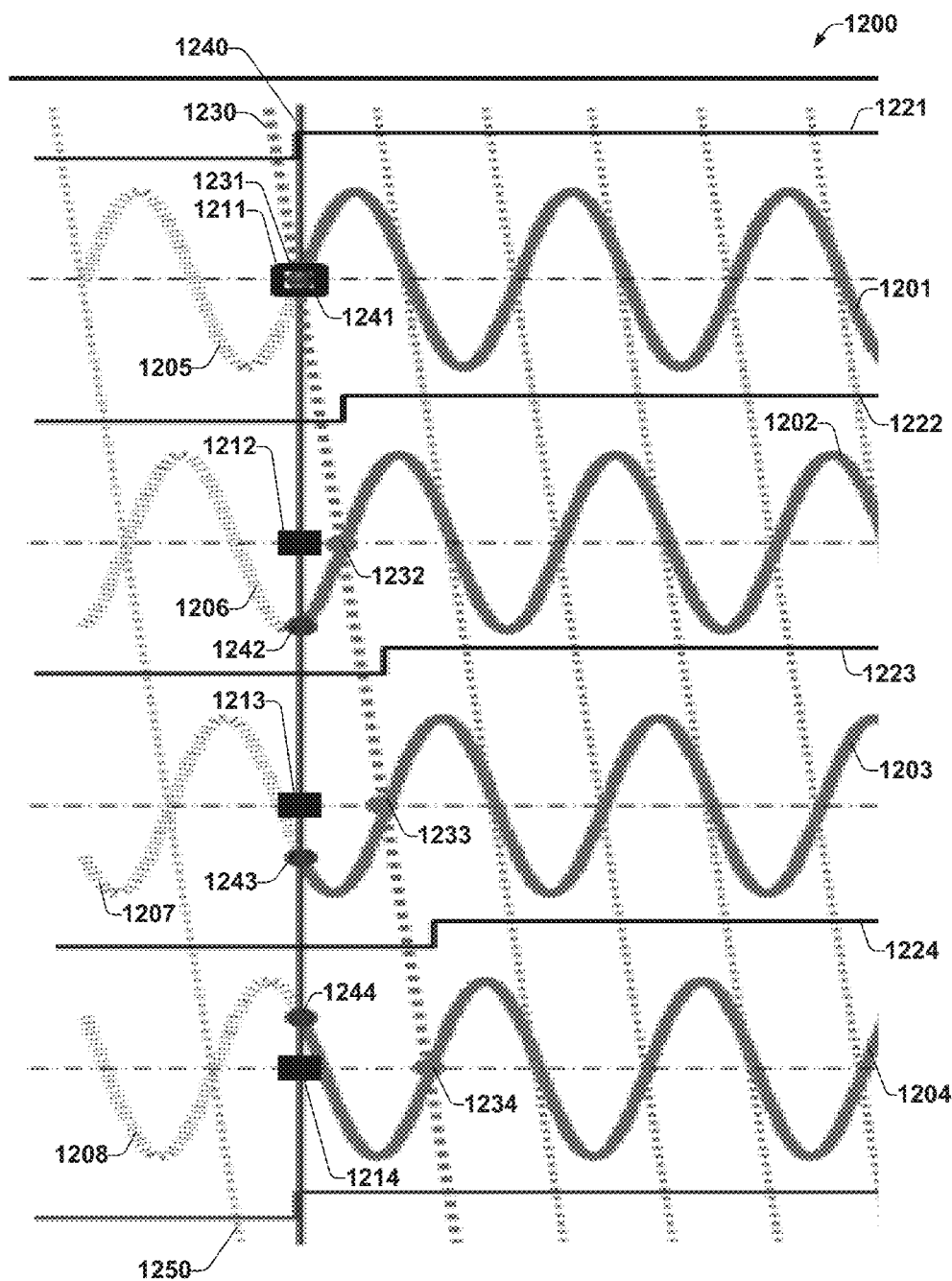
FIG. 12 illustrates a plurality of waveforms having undergone time delay and phase shift on each IF portions of their respective channels.

The following illustrates that TTD sequential pulsing is not required for beam steering, in accordance with the various embodiments presented herein. The majority of contemporary radar systems, including SAR, utilize pulsed signal transmission. The aforementioned modulation schemes can be applied to such pulsed systems. FIG. 12 presents a schematic 1200 of four signals having waveforms 1201-1204 being generated at four antenna elements 1211-1214, whereby the antennas 1211-1214 are included in an array antenna (not shown). It is to be appreciated that while only four antenna elements 1211-1214 are illustrated, the various embodiments are applicable to an array antenna comprising M×N antenna elements, whereby M and N are positive integers greater than zero. The four waveforms 1201-1204 represent the respective waveform at t≥0, further four waveforms 1205-1208 represent the respective waveform for t<0.

The rising edges of the lines 1221-1224 presented in FIG. 12 indicates pulses being generated at each antenna element 1211-1214 can be sequentially delayed for beam steering to occur.

The dashed line 1230 and points 1231-1234 indicate a corresponding wave initiation in time for phase synchronization. A pulse generator capable of picosecond delay at each element 1221-1224 to accomplish such a feat is neither practical nor necessary.

Per the various embodiments presented herein, (e.g., per FIGS. 1 and 11) all of the antenna elements 1211-1214 of an antenna array can be pulsed simultaneously after DDS IF-modulation (e.g., by DDS component 115), e.g., the various embodiments presented herein enable a wave generator (e.g., AWG 113) having a plurality of channels (e.g., channel 102, channel 103 . . . channel n) to output waveforms 1201-1204 at the same time (e.g., concurrently), however, each of the waveforms 1201-1204 can have a different initial phase. The vertical line 1240 and points 1241-1243 indicate the corresponding wave initiation in time (t=0) for phase synchronization. It is as if the traditional pulsed waves begin at the dotted line 1250 in FIG. 12 and were sampled by the vertical line 1240 at a later instance in time for each of the channels, e.g., antenna elements 1211-1214. Accordingly, the various embodiments presented herein enable generation of TTD by simultaneous pulsing in a manner which is more practical to implement than TTD sequential pulsing, as conventionally utilized.

It is to be appreciated that while the waveforms 1201-1204 are shown as having waveforms of a constant periodicity, the waveforms 1201-1204 can also be chirps such that the respective chirp initiation (e.g., low chirp) and chirp termination (e.g., high chirp) for each waveform can be configured such that the beam (e.g., the beam 190) formed from the respective chirps is steered as required, e.g., in accordance with a beam steering algorithm (e.g., beam steering algorithm 196).

In an embodiment, multiple pulse-modulated IF waveform generation (e.g., waveforms 104, 107, 204) and LO feed signaling (e.g., oscillator signals 132, 231) may be synced across all of the antenna elements 1211-1214 by equal or unequal path length transmission lines (e.g., by any of the respective lengths $l_1$, $l_2$, $l_3$ and $l_4$, per FIG. 1). In a further embodiment, residual delays and amplitude errors resulting from unequal path length transmission lines can be compensated for during a calibration operation by changing the effective TTD and CPS generated by the respective DDS components (e.g., by DDS component 115) and their amplitudes at the IF input port (e.g., IF input ports 124 and/or 126). Because time delay (τ) and phase (Φ) compensation are performed in the digital domain (e.g., respectively by time component 116 and phase component 117), the radar architecture (e.g., as presented in FIGS. 1 and 11) enables larger manufacturing tolerances with regard to transmission line length, etc., which further enables improvement in production scalability. Further, the beam steering algorithm 196 can be utilized to generate respective signals 105 and 108 to compensate for channel-to-channel imbalance as a function of temperature, operating environment, etc.

Simultaneous pulsing of TTD waveforms affects the spatial transient wave front formation process of the radiated beam, e.g., beam 190. For example, the shape of the rising edge of the detected pulse (e.g., any of pulse waveforms 1201-1204) will be different depending on the direction of observation. This is also true for the case of TTD sequential pulsing. The following is an examination of waveforms generated by both TTD simultaneous pulsing (per the embodiments presented herein) and also TTD sequential pulsing.

A time delay between the $n^{th}$ element location $\vec{r}_n$ and the observer's position $\vec{r}$ can be considered to be $$\tau_n = \frac{\vec{r} - \vec{r}_n}{c_0},$$

where $c_0$ is the speed of light in vacuum. Further, $$\tau_{0,n} = \frac{\vec{r}_n \cdot \hat{r}_n}{c_0}$$

is the time delay required for steering to the direction $\hat{r}_0$. Ignoring propagation losses, the wave amplitude as a function of position $\vec{r}$ and time t for the case of simultaneously-turned-on but TTD sinusoidal excitation with angular frequency may be expressed as:

$$F(\vec{r},t) = \Sigma_{n=1}^{N} U(\tau_n - t)\cos(\omega(t - \tau_{0,n} - \tau_n)),\qquad \text{Eqn. 10}$$

where U(t)=1, t≥0, U(t)=0, t<0 is the standard unit-step function. Similarly, for the case of sequential-turned-on but TTD sinusoidal excitation, the following expression can be derived:

$$G(\vec{r},t) = \Sigma_{n=1}^{N} U(\tau_n - (t - \tau_{0,n})) U(t - \tau_{0,n}) \cos(\omega(t - \tau_{0,n} - \tau_n))\qquad \text{Eqn. 11}$$

Figure 13A:
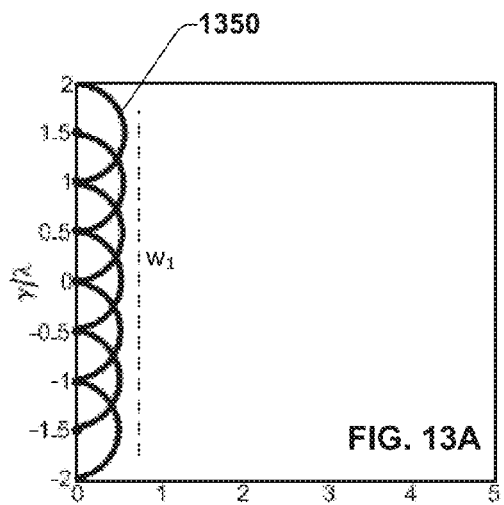
Figure 13B:
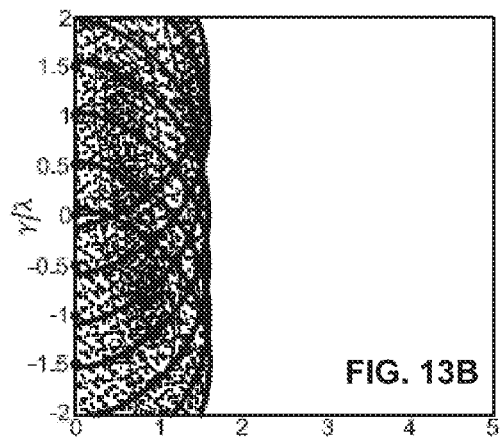
Figure 14A:
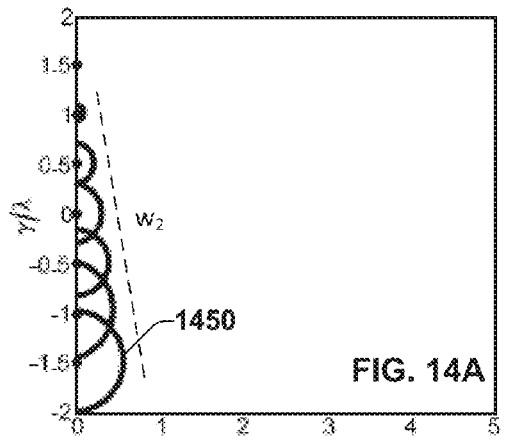
Figure 14B:
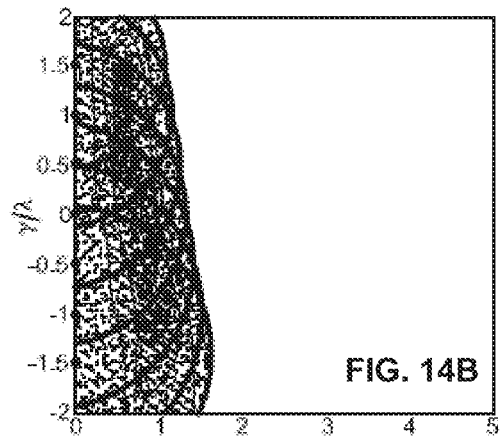
Figure 15A:
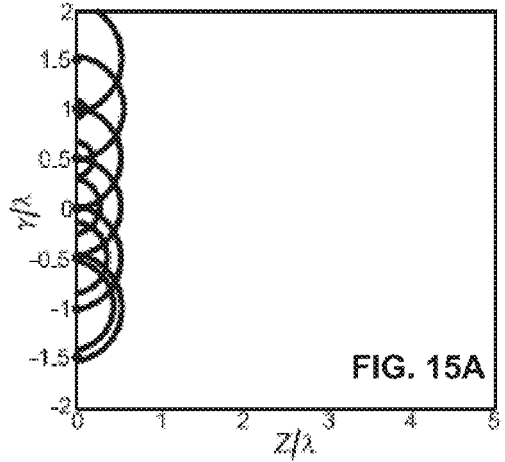
Figure 15B:
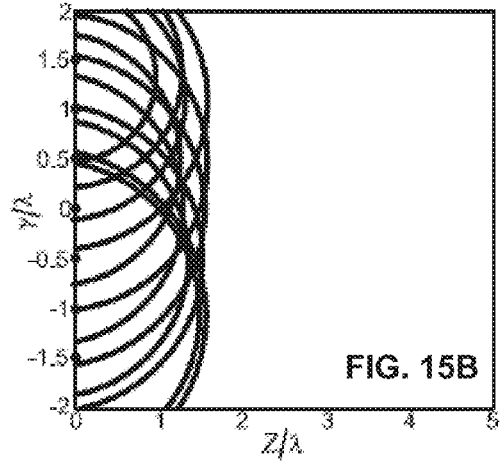
Figure 13C:
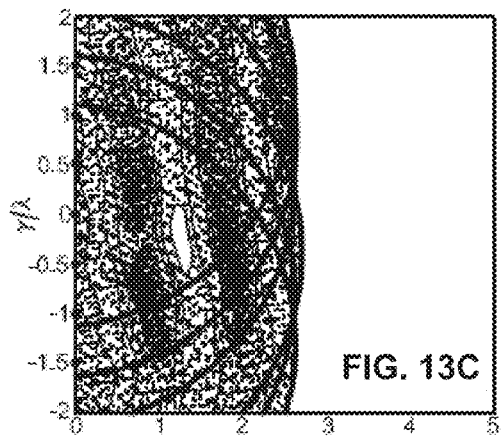
Figure 13D:
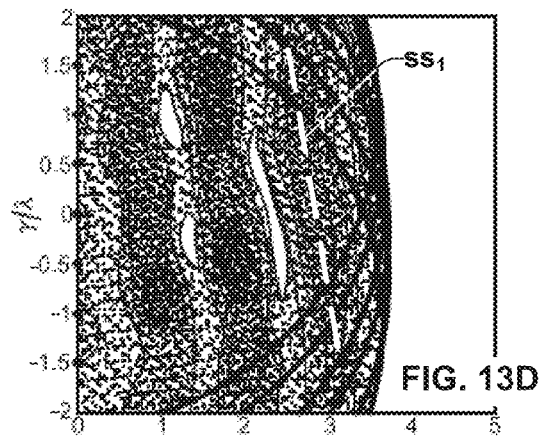
Figure 14C:
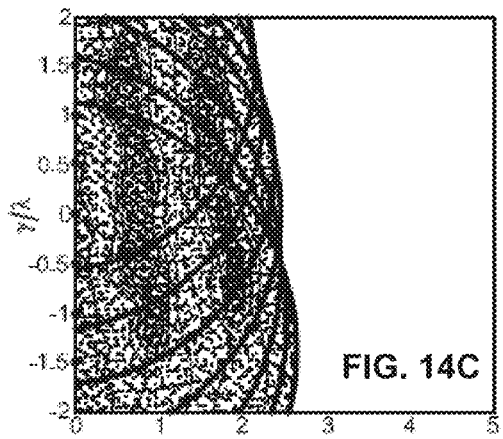
Figure 14D:
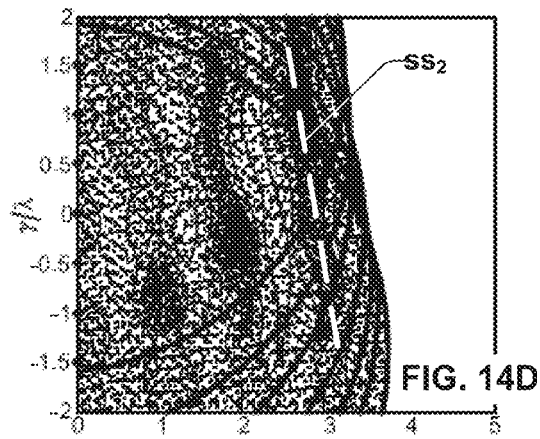
Figure 15C:
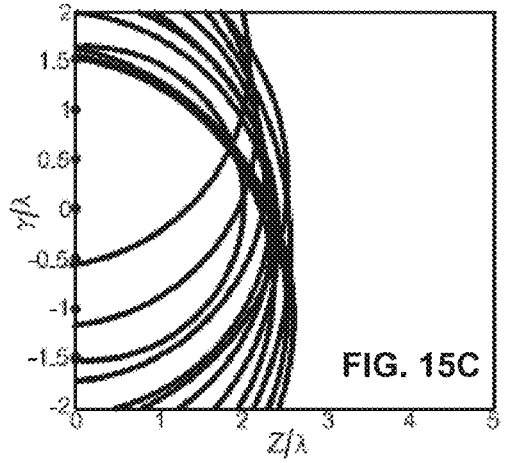
Figure 15D:
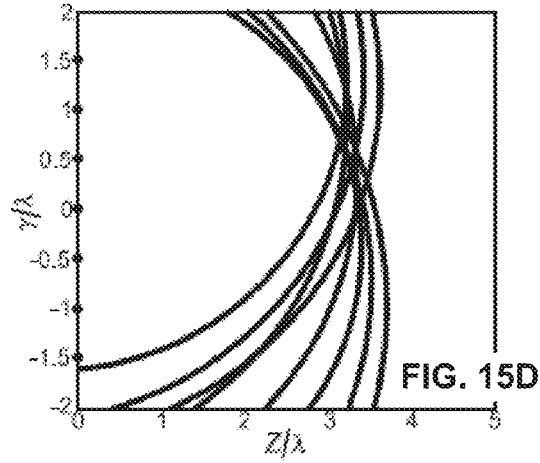

The results of these expressions are provided in the respective wave front image sequences of FIGS. 13A-E, 14A-E and 15A-E, whereby the respective images are for different instances in space and time for a linear array comprising 7 antenna elements situated vertically along the y-axis, respectively at −1.5, −1.0, −0.5, 0, 0.5, 1.0, 1.5, as indicated by the points on the y-axis. FIGS. 13A-E relate to wave front formation based upon $F(\vec{r},t)$, e.g., simultaneous turn-on (per the embodiments presented herein), whereby the wave front is comparable to a wavefront of beam 190, per FIG. 1. FIGS. 14A-E relate to wave front formation based upon $G(\vec{r},t)$, e.g., sequential turn-on, and FIGS. 15A-E present the differences (e.g., F-G) between the simultaneous turn-on of FIGS. 13A-13E and the sequential turn-on of FIGS. 14A-14E. During generation of the images 13A-15E, a λ/2 inter-element spacing and TTD for 10° steering were applied. FIGS. 13A, 14A, and 15A are for $\tau_N$, FIGS. 13B, 14B, and 15B are for $3\tau_N$, FIGS. 13C, 14C, and 15C are for $5\tau_N$, FIGS. 13D, 14D, and 15D are for $7\tau_N$, and FIGS. 13E, 14E, and 15E are for $9\tau_N$.

As shown in FIG. 13A versus FIG. 14A, each of the antenna elements in FIG. 13A are configured for simultaneous turn-on for transmission (e.g., simultaneous turn-on of respective signals 1350), as evidenced by the flat wavefront $w_1$, compared with the sequential turn-on (e.g., sequential turn-on of respective signals 1450) of the antenna elements in FIG. 14 engendering an angled wavefront $w_2$. Accordingly, it is evident from FIGS. 13-15, that while the wave front transients for both $F(\vec{r},t)$ (e.g., FIGS. 13A-13E) and $G(\vec{r},t)$ (e.g., FIGS. 14A-14E) waveform generations depend on the observation location (e.g., angle of $w_1$ versus $w_2$), whereas the steady-state results, $ss_1$ and $ss_2$ (e.g., what's behind the wave fronts $w_1$ and $w_2$) are identical after a minor delay, e.g., at $3\tau_N$, and as indicated on FIGS. 13D and 14D.

Although not shown, the turn-off process for both $F(\vec{r},t)$ and $G(\vec{r},t)$ waveform generation should be comparable. Further, for SAR applications, a return pulse from the ground should be gated to remove any unwanted transient effects.

Figure 16:
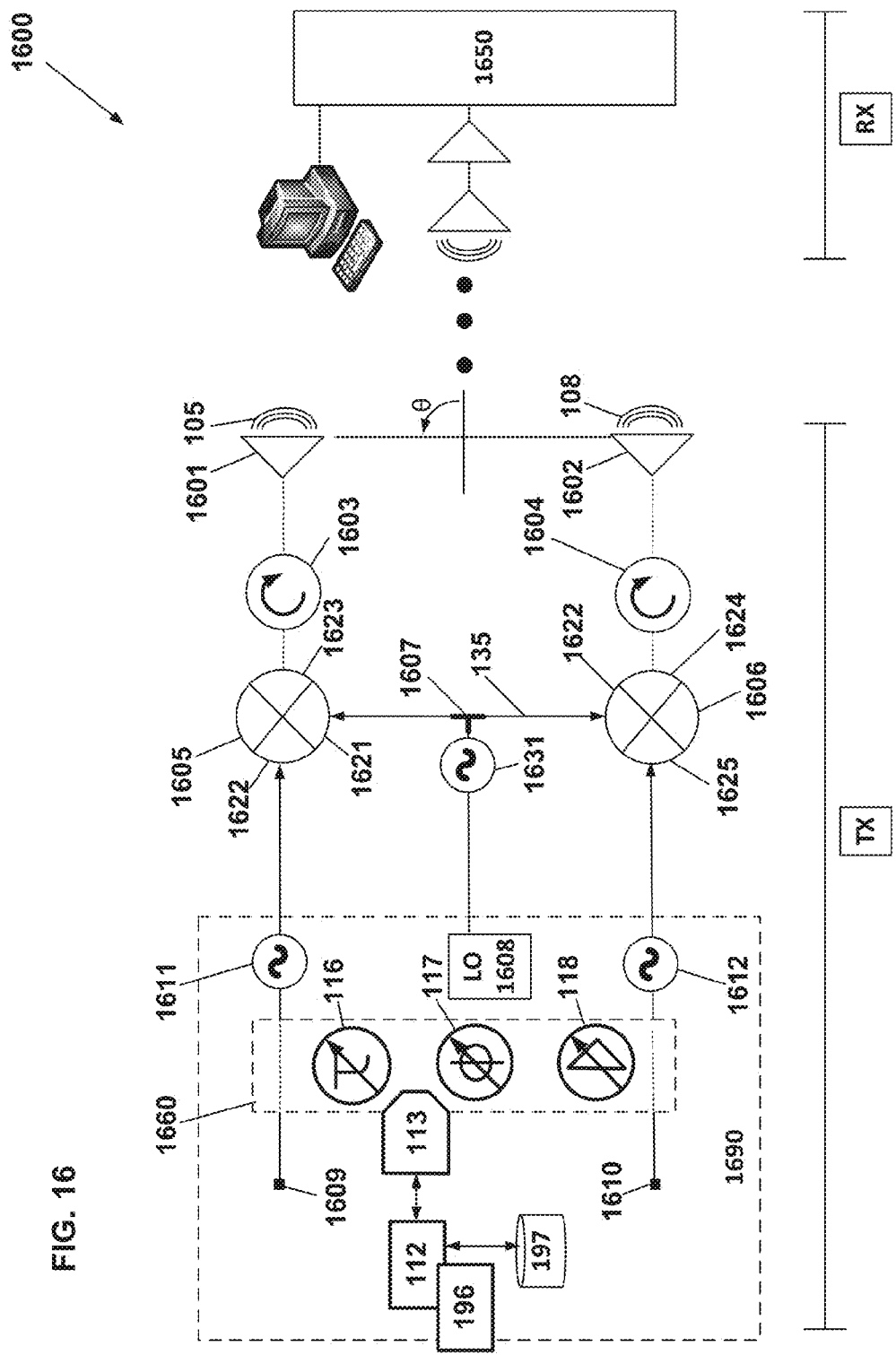
FIG. 16 illustrates an exemplary system for modifying the intermediate frequency (IF) waveforms prior to conversion to RF signals.

The following presents results from a broadband (15.2 GHz-18.2 GHz) electronic beam steering experiment. FIG. 16 is a schematic of a radar system 1600 utilized during the experiment. The radar system 1600 comprises a transmit array antenna comprising two short differentially-fed Ku-band horns 1601 and 1602 spaced at 48.4 mm or ~3λ at 18.2 GHz. Such a large spacing was selected to illustrate the steering inability of digital-emulated PS at IF beyond modulo-2π; whereas digital-emulated TTD has no such limitations. Differential feeding was utilized to benefit from the improved detection sensitivity of null steering.

Input match and isolation of the horns' 1601 and 1602 were improved by attachment of respective RF isolators 1603 and 1604. The isolators 1603 and 1604 in turn connect to the RF output ports 1623 and 1624 of two Ku-band mixers 1605 and 1606. The LO input ports 1621 and 1622 of the mixers 1605 and 1606 are tied together via a 3-dB power splitter 1607 and fed by a 10-dBm 15.1-GHz RF source signal 1631 from a LO 1608. The IF input ports 1622 and 1625 of the mixers 1605 and 1606 respectively connect to separate channels 1609 and 1610 of a 12 Gs/s signal module 1690. The signal module 1690 can include an AWG 113 which is programmed to output modified linear chirps 1611, 1612 from about 0.1 to about 3.1 GHz every 20 ms over the two synchronized channels 1609 and 1610. The AWG 113 can be operating in conjunction with a virtual DDS component 1660, for example, the controller 112 can utilize the beam steering algorithm 196 (in conjunction with parameters, etc., stored on memory device 197) to define respective values and/or conditions for each of the time (τ) component 116, the phase (Φ) component 117, and the amplitude component 118 for the waveforms 1611 and 1612.

Subsequent to mechanical and electrical alignment of the transmit array with its direct facing high-gain receiver horn, the array's antenna pattern was measured using a spectrum analyzer 1650 at all angles in the plane of beam steering as a function of frequency. The AWG 113 was re-programmed such that a CPS (e.g., CPS 117) of 180° is added to one of the channels (e.g., either of channels 1609 or 1610). FIGS. 17 and 18 present normalized antenna array patterns (e.g., ultra-wide band UWB) illustrating mode switching between a mono-pulse mode (e.g., tracking) per FIG. 17, and an imaging mode, per FIG. 18. As shown, a null 1710 in FIG. 17 at bore sight (e.g., θ=0) is immediately made into a peak 1810 over the entire frequency range of the chirp, as shown in FIG. 18.

Figure 20:
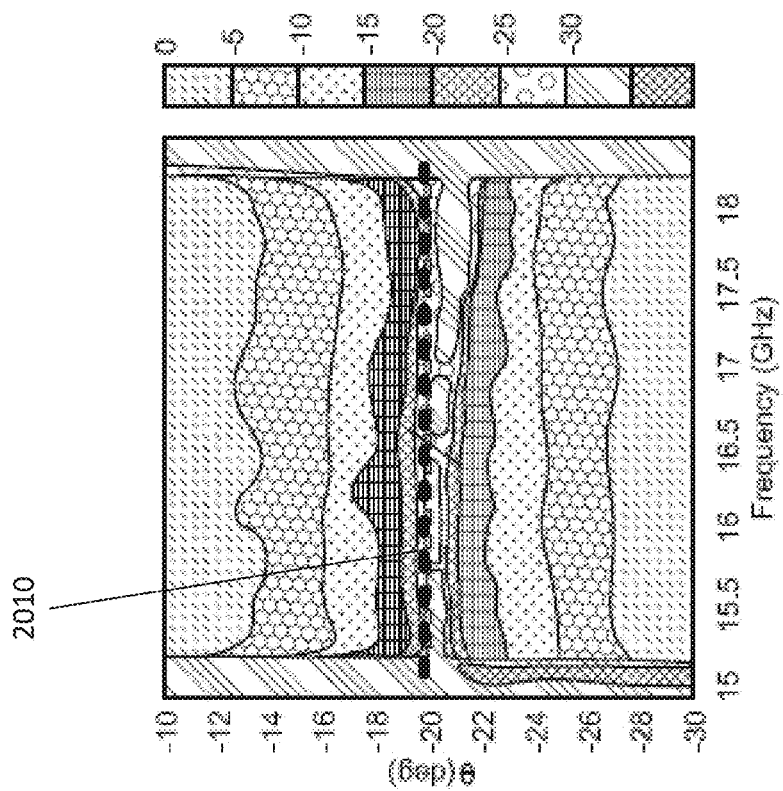
FIG. 20 is a normalized RF antenna array pattern for IF-based TTD RF beam steering.
Figure 19:
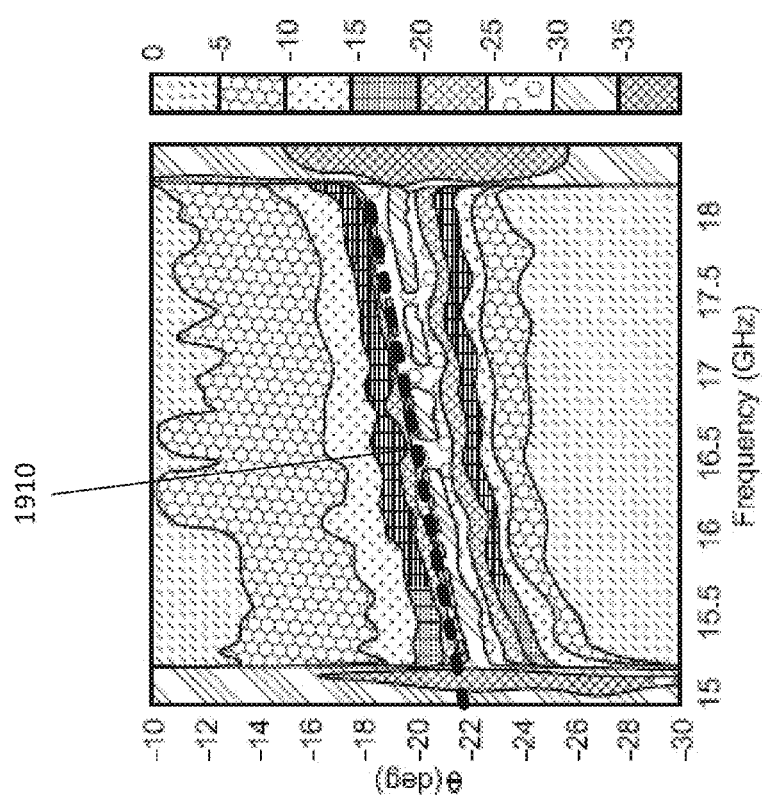
FIG. 19 is a normalized RF antenna array pattern for CPS beam steering at IF or RF.

The experimental results demonstrate successful broadband TTD steering by utilizing digital devices (e.g., DDS) at IF are shown in FIGS. 19 and 20. FIGS. 19 and 20 present normalized antenna array patterns illustrating differences between CPS beam steering (e.g., FIG. 19, where θ=−20°) and TTD digital beam steering (e.g., FIG. 20, where θ=−20°) at IF. The AWG 1690 can be programmed to output either a CPS (centered at 16.7 GHz) or a TTD version (whereby the TTD version includes a required CPS of the oscillator signal (e.g., a LO carrier) at 15.1 GHz) of a broadband chirp over one of its channels (e.g., channel 1609 or 1610) for beam steering to θ=−20°. It is readily apparent from the slant of the line 1910 that frequency dependent steering errors on the order of ±2° are evident over the entire bandwidth in the CPS patterns of FIG. 19. This is expected, because CPS only minimizes beam pointing error nearer its center frequency of 16.7 GHz. As shown by the horizontal line 2010 in FIG. 20, any steering errors have been significantly reduced in the TTD (plus CPS) patterns, particularly at frequencies less than 16.7 GHz, e.g., the horizontal line 2010 holds steady at the beam steering of θ=−20°. Accordingly, with minimal steering error between 15.2-18.2 GHz, for a center frequency of 16.7 GHz, a fractional bandwidth of 3/16.7=17.96% was achieved.

Figure 21:
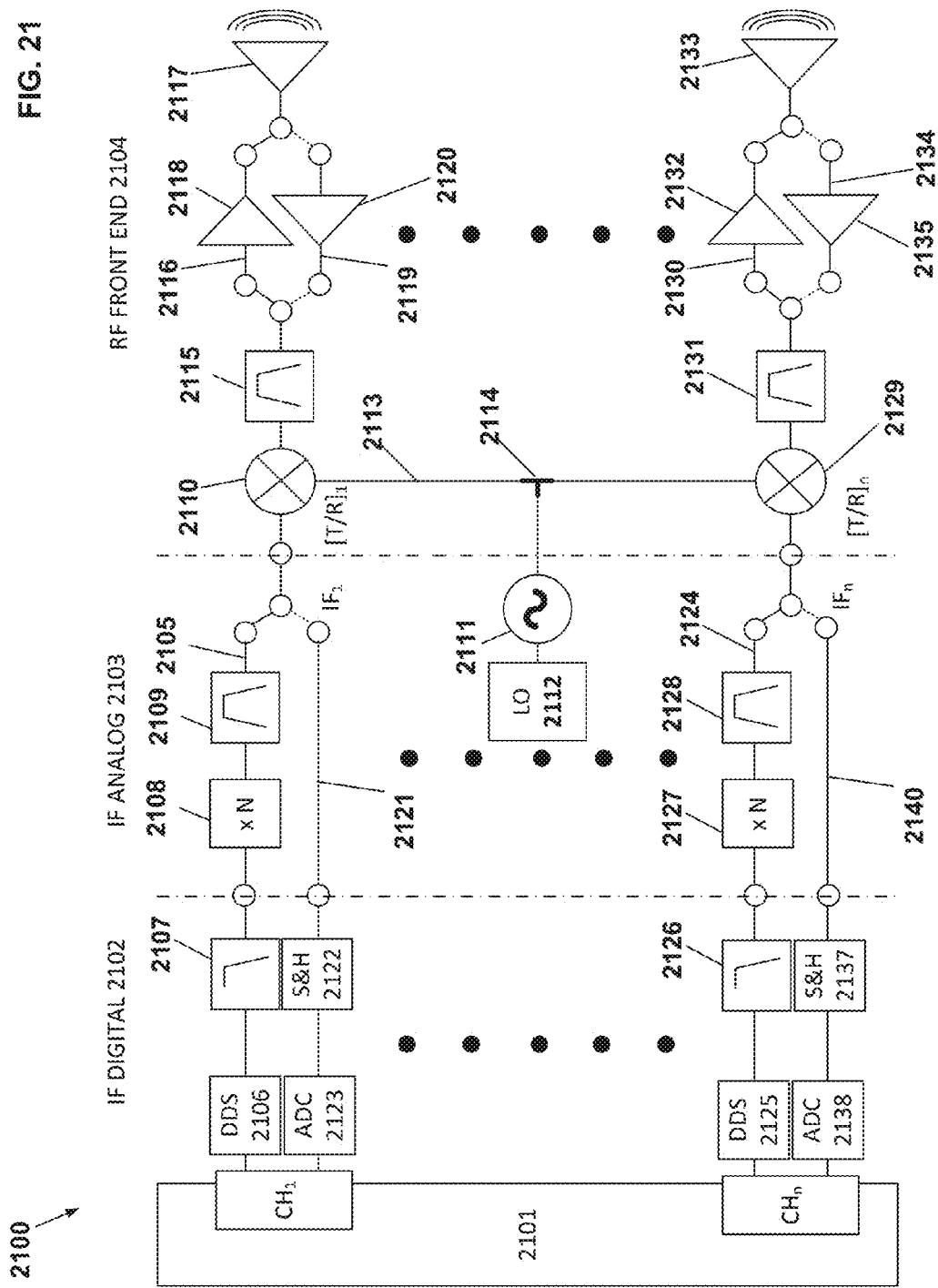
FIG. 21 illustrates a system for formation of a broadband TTD digital beam.

FIG. 21 illustrates a system 2100 for formation of a broadband TTD digital beam, wherein system 2100 can be an array antenna such as a multi-phase-center radar configured to perform TTD delay at each antenna element. System 2100 can comprise n channels transmitting and receiving signals via n antenna elements, whereby the system 2100 can operate in accordance with one or more embodiments as presented herein, e.g., system 2100 further illustrates a DDS component(s) being incorporated into a system that can both transmit one or more radar signals (or pulses) and further receive and process one or more radar echoes.

As illustrated a digital transceiver 2101 can be utilized to generate and receive respective signals across system 2100, whereby transceiver 2101 can generate signals in a manner similar to AWG 113. The respective channels can be considered as three separate portions, an IF digital portion 2102, an IF analog portion 2103, and a RF front end portion 2104. A first transmission circuit 2105 of the first channel $CH_1$ includes a DDS 2106 and a low pass filter 2107. The DDS 2106 can include one or more components as previously described, such as a time component (e.g., 116), a phase component (e.g., 117), and/or an amplifier (e.g., 118). In the IF analog portion 2103 of the first transmission circuit 2105 an multiplier 2108 and a band pass filter 2109 can be utilized to intermediately convert an IF signal prior to up-conversion to an RF signal at the mixer 2110. Mixer 2110 can be mixed with a oscillator signal 2111 generated by an oscillator 2112, whereby the oscillator signal 2111 can be transmitted to the mixer 2110 via a corporate fed network 2113 which includes one or more splitters 2114.

Following conversion, the signal can pass through a band pass filter 2115 and further transmitted along a first RF transmission circuit 2116 for transmission via a first antenna element 2117 ($ANT_1$). The first RF transmission circuit 2116 can include an amplifier 2118.

An echo signal can be received at the first antenna element 2117, which can be passed along the RF receiver circuit 2119. The receiver circuit 2119 can include an amplifier 2120, whereby the echo signal can further pass through the band pass filter 2115, before being down-converted at the mixer 2110 from an RF signal to an IF signal. The IF echo signal can be received on the IF receiver circuit 2121 and accordingly processed at a sweep and hold (S&H) device 2122 and an analog to digital convertor (ADC) 2123, to be subsequently processed at $CH_1$ of the digital transceiver 2101.

As shown in FIG. 21, a plurality of channels can be serviced by the digital transceiver 2101. Components and circuitry comprising $CH_n$ can be the same as that utilized in $CH_1$, with comparable components being indicated by common circuitry symbols. Hence, a second IF transmission channel 2124 can include a DDS component 2125, a low pass filter 2126, a multiplier 2127, and a band pass filter 2128. Up-conversion from IF to RF can be performed at a mixer 2129 connected to the LO 2112. The RF signal can pass through a band pass filter 2131, and be transmitted by antenna element 2133 ($ANT_n$), via a RF transmission circuit 2130 which can include an amplifier 2132. Echo reception on the $CH_n$ can be via a second RF receiver circuit 2134, which can include an amplifier 2135. Down-conversion of the RF echo to IF can be via mixer 2129. Reception of the IF echo at the digital transceiver 2101 can be via an IF receiver circuit 2140, which can include a S&H device 2137 and an ADC 2138. Low-side-levels can be achieved by applying amplitude tapering digitally at the IF region 2102.

Per the various embodiments presented herein, various hardware implementation workarounds can be utilized to achieve desired time and amplitude quantization on delayed signal representation, and any effects associated therewith. For example, rather than digitally generating the entire 3 GHz of IF bandwidth (e.g., per FIGS. 17-20), analog frequency multipliers and filtering can be utilized to increase the bandwidth of digitally synthesized IF signal prior to up conversion.

FIGS. 22-25 illustrate exemplary methodologies relating to beam steering an array antenna by modifying lower and/or IF waveforms prior to conversion to RF signaling. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement the methodologies described herein.

Figure 22:
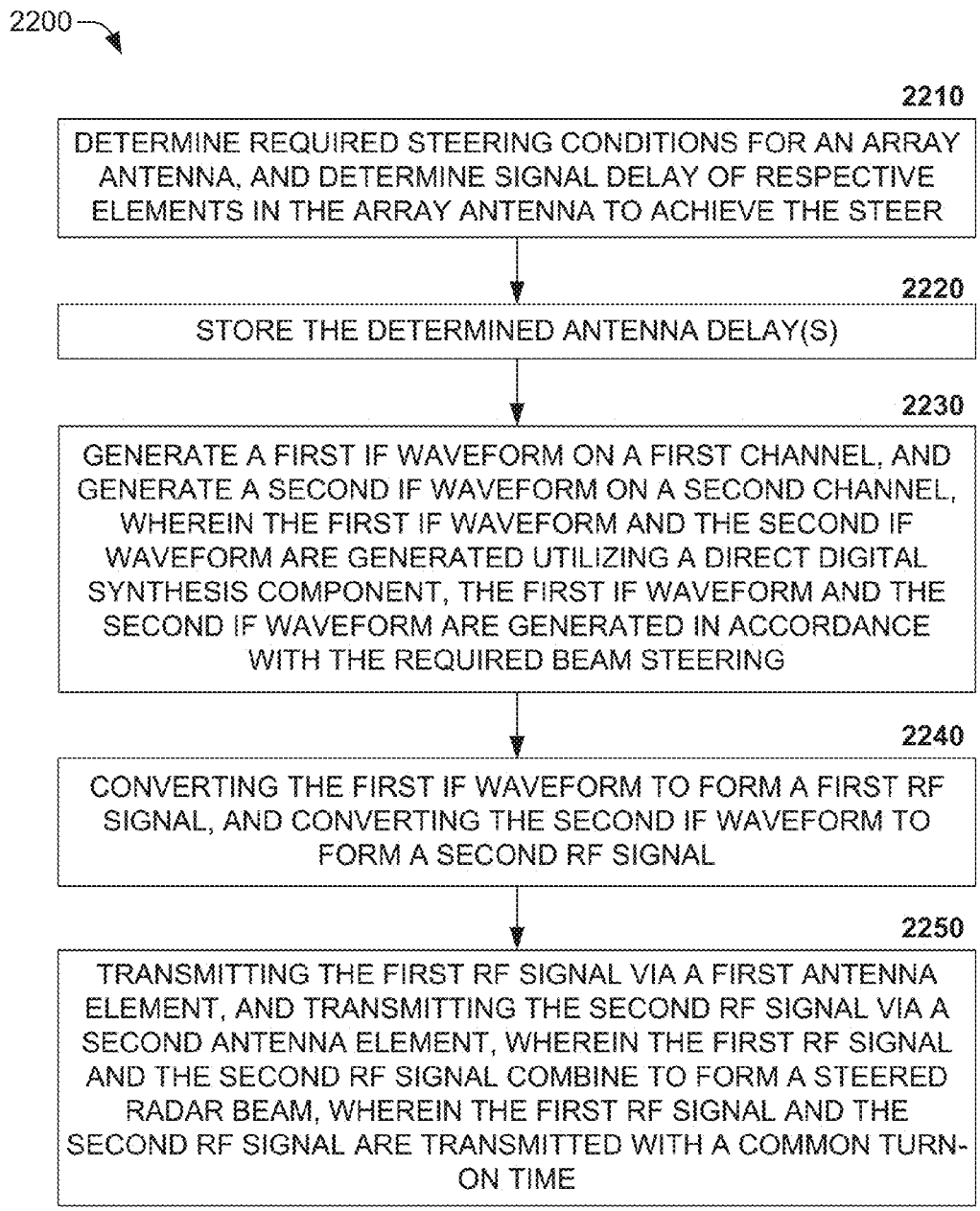
FIG. 22 is a flow diagram illustrating an exemplary methodology for generating IF waveforms prior to conversion to RF signals.

FIG. 22 illustrates a methodology 2200 relating to modifying lower frequency and/or IF waveforms prior to conversion to RF signaling to enable beam steering of an array antenna.

At 2210, one or more required steering conditions for an array antenna can be determined. For example, the steering conditions can be a function of a location of the array antenna and a direction to a target of interest, a function of circuitry forming the antenna array (e.g., length of respective transmission lines), etc. The required steering conditions can be determined by a controller component, whereby the controller component can utilize a beam steering algorithm to enable a plurality of signals to be transmitted such that the signals interact (e.g., constructively and/or destructively interfere) to form the steered beam, whereby individual output conditions for each antenna element can relate to a reference beam (e.g., signal conditions of a second transmission signal relative to a first transmission signal), as well as compensating for such effects as individual transmission line length, etc.

At 2220, the respective required steering conditions can be stored in a memory device for subsequent retrieval by the controller component.

At 2230, a first waveform can be generated on a first channel of a waveform generator, and also a second waveform can be generated on a second channel of the waveform generator. In an embodiment, the waveform generator can be operating in conjunction with the controller component, wherein the controller component utilizes a DDS component to enable generation of the first waveform and the second waveform. The DDS component can be an algorithm, instructions, etc., which can operate on the waveform generator such that the first waveform can be generated with a required first timing, first phase, and/or first amplitude and the second waveform can be generated with a required second timing, second phase, and/or second amplitude. The DDS component can operate in accordance with one or more values generated by the beam steering algorithm. For example, the first waveform can be configured as a reference waveform (or a base waveform) and the second waveform can be configured such that a beam formed with the first waveform and the second waveform is accordingly steered. At least one of the first IF waveform or the second IF waveform can be modified in accordance with one or more outputs generated by the beam steering algorithm. The first IF waveform can have different signal form and timing compared to the second IF waveform. For example, the first IF waveform can act as a reference waveform, against which the second IF waveform is modified. In an example, the second IF waveform can have its phase modulated such that a peak amplitude of the second IF waveform is reached 1 picosecond later than the first IF waveform reaches its peak amplitude. The first IF waveform and the second IF waveform can be generated in accordance with a required beam steering, e.g., respectively having desired amplitude(s), phase(s), and/or time delay(s).

At 2240, the first IF waveform can be converted to form a first RF signal, and the second IF waveform can be converted to form a second RF signal. The conversion of the first IF waveform can be performed at the first mixer, whereby the conversion is performed in conjunction with an oscillator signal received at a first LO input port of the first mixer. The converted first RF signal can be output from the mixer on a first RF output port. The conversion of the second IF waveform can be performed at the second mixer, whereby the conversion is performed in conjunction with the oscillator signal received at a second LO input port of the second mixer. The up-converted second RF signal can be output from the mixer on a second RF output port. The oscillator signal received at the first LO input port of the first mixer can be a common signal to the oscillator signal received at the second LO input port of the second mixer.

At 2250, the first RF signal can be transmitted from a first antenna element located on the first channel as a first transmitted signal, and the second RF signal can be transmitted as a second transmitted signal from a second antenna element located on the second channel. The first RF signal and the second RF signal combine to form a steerable beam (in conjunction with n RF signals being generated from n other antenna elements included in the array antenna), whereby, through constructive and destructive interference, an amplitude in the steerable beam is directed towards the direction of the target of interest.

Figure 23:
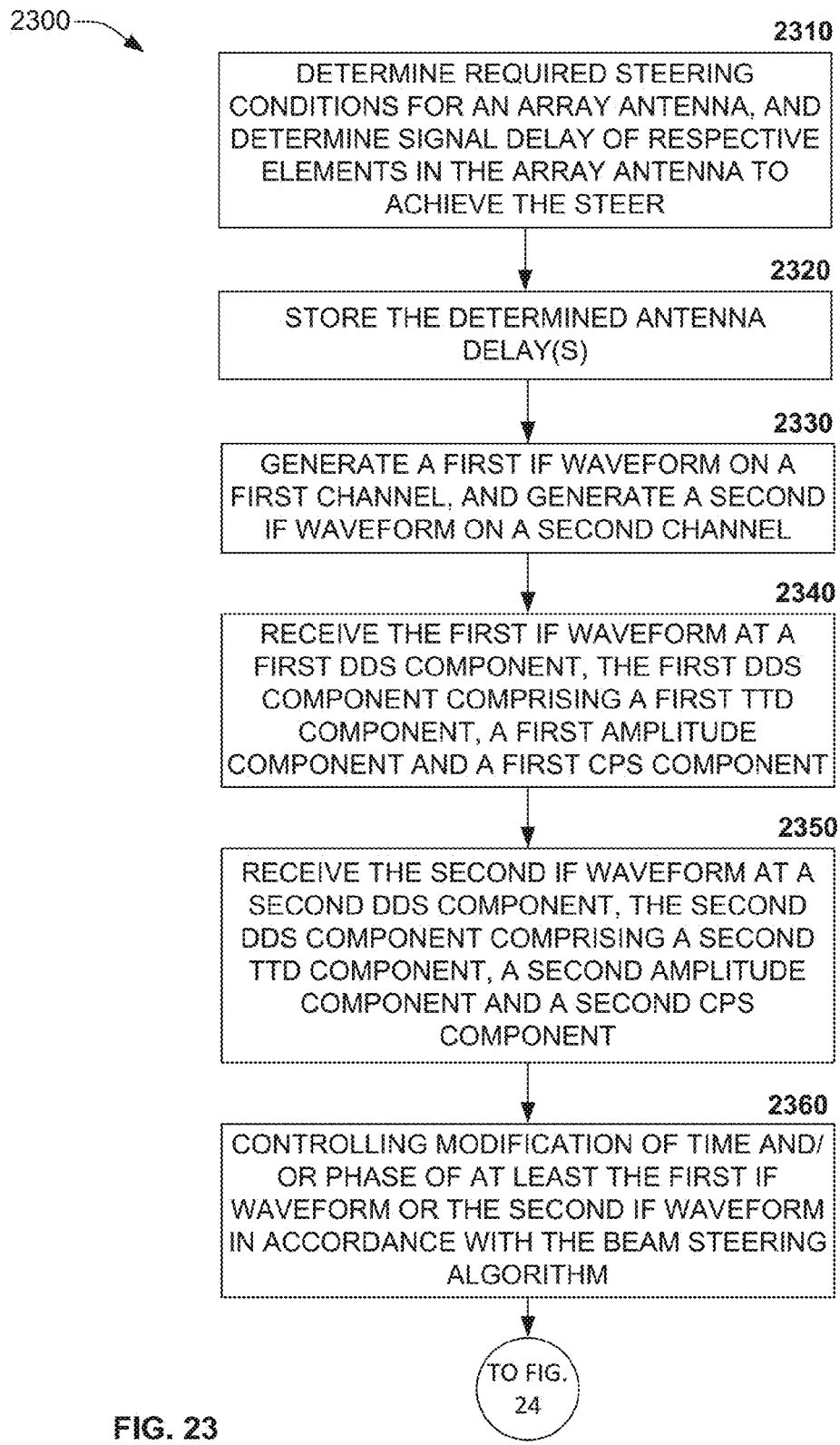
FIG. 23 is a flow diagram illustrating an exemplary methodology for modifying IF waveforms prior to conversion to RF signals.
Figure 24:
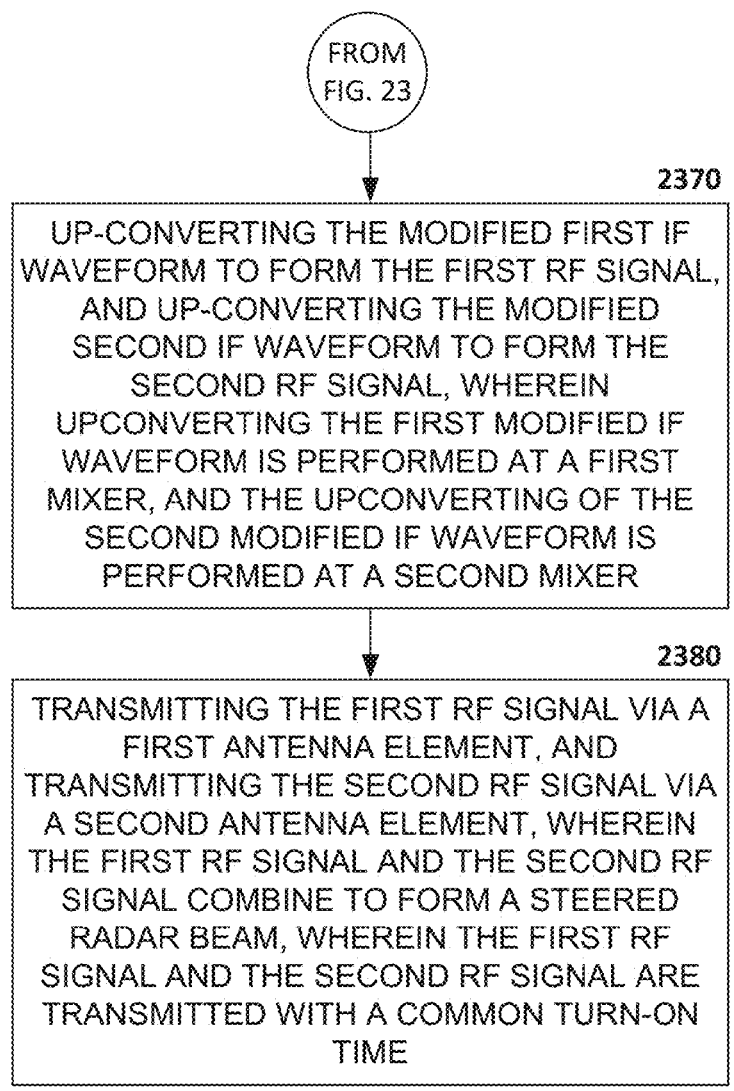
FIG. 24 is a continuation of the flow diagram of FIG. 9 illustrating an exemplary methodology for modifying IF waveforms prior to conversion to RF signals.

FIGS. 23 and 24 illustrate a methodology 2300 relating to modifying lower and/or IF waveforms prior to conversion to RF signaling to enable beam steering of an array antenna.

At 2310, one or more required steering conditions for an array antenna can be determined. For example, the steering conditions can be a function of a location of the array antenna and a direction to a target of interest, a function of circuitry forming the antenna array (e.g., length of respective transmission lines). The required steering conditions can be identified by a controller component, whereby the controller component can utilize a beam steering algorithm to enable a plurality of signals to be transmitted such that the signals interact (e.g., constructively and/or destructively interfere) to form the steered beam, whereby individual output conditions for each antenna element can relate to a reference beam (e.g., signal conditions of a second transmission signal relative to a first transmission signal), as well as compensating for such effects as individual transmission line length, etc.

At 2320, the respective required steering conditions can be stored in a memory device for subsequent retrieval by the controller component.

At 2330, a first waveform can be generated on a first channel of a waveform generator, and also a second waveform can be generated on a second channel of the waveform generator. In an embodiment, the first waveform and the second waveform can initially be generated by the wave generator with a baseband spectral magnitude, whereby the first waveform and the second waveform can subsequently be modulated to respectively form a first IF waveform and a second IF waveform. In another embodiment, the first waveform and the second waveform can be generated by the wave generator as a first IF waveform and a second IF waveform.

At 2340, the first IF waveform can be received at a first DDS component, whereby the DDS component comprises a first TTD component and a first CPS component. The first DDS component can be located on the first channel, e.g., at an IF input port of a first mixer.

At 2350, the second IF waveform can be received at a second DDS component, whereby the DDS component comprises a second TTD component and a second CPS component. The second DDS component can be located on the second channel, e.g., at an IF input port of a second mixer.

At 2360, at least one of the first IF waveform or the second IF waveform can be modified in accordance with one or more outputs generated by the beam steering algorithm. The first IF waveform can have different signal form and timing compared to the second IF waveform. For example, the first IF waveform can act as a reference waveform, against which the second IF waveform is modified. Hence, the second IF waveform can have its phase modulated such that a peak amplitude of the second IF waveform is reached 1 picosecond later than the first IF waveform reaches its peak amplitude.

At 2370, the modified first IF waveform can be up-converted to form a first RF signal, and the modified second IF waveform can be up-converted to form a second RF signal. The conversion of the first IF waveform can be performed at the first mixer, whereby the conversion is performed in conjunction with an oscillator signal received at a first LO input port of the first mixer. The converted first RF signal can be output from the mixer on a first RF output port. The conversion of the second IF waveform can be performed at the second mixer, whereby the conversion is performed in conjunction with the oscillator signal received at a second LO input port of the second mixer. The upconverted second RF signal can be output from the mixer on a second RF output port. The oscillator signal received at the first LO input port of the first mixer can be a common signal to the oscillator signal received at the second LO input port of the second mixer.

At 2380, the first RF signal can be transmitted from a first antenna element located on the first channel as a first transmitted signal, and the second RF signal can be transmitted as a second transmitted signal from a second antenna element located on the second channel. The first RF signal and the second RF signal combine to form a steerable beam (in conjunction with n RF signals being generated from n other antenna elements included in the array antenna), whereby, through constructive and destructive interference, an amplitude in the steerable beam is directed towards the direction of the target of interest.

Figure 25:
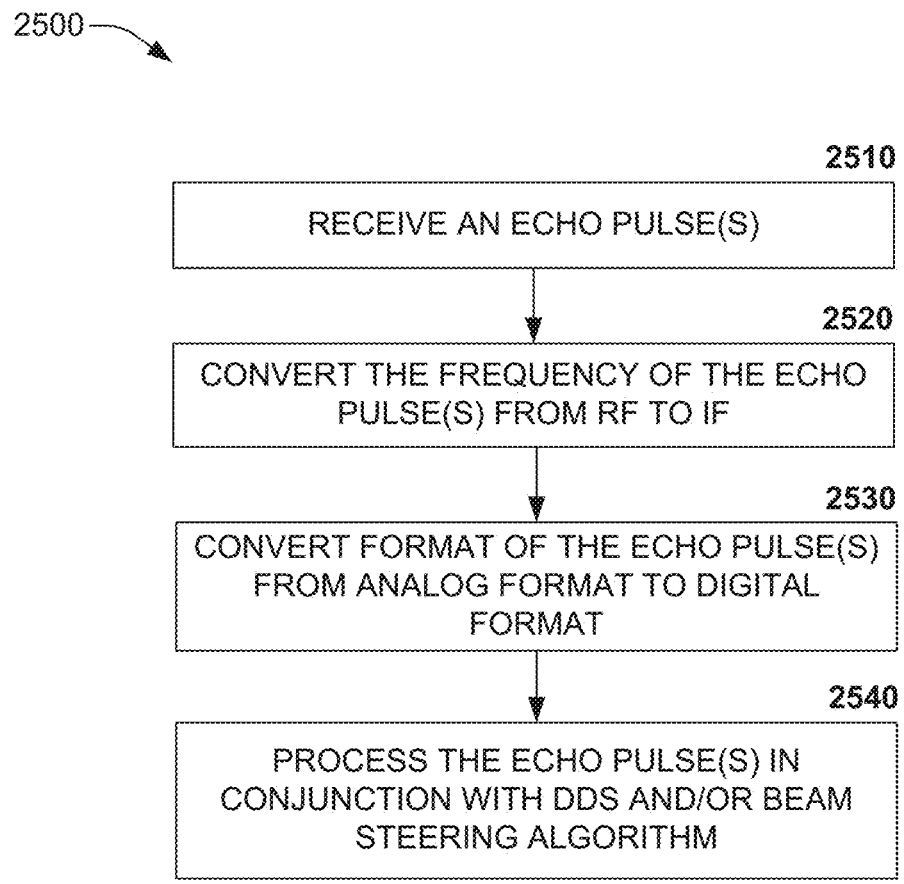
FIG. 25 is a flow diagram illustrating an exemplary methodology for processing one or more echo pulses.

FIG. 25 illustrates a methodology 2500 relating to processing of one or more received echo pulses (received signals, returned signals) to facilitate identification of information conveyed by the echo pulses (e.g., target information, terrain information, etc.).

At 2510, one or more echo pulses are received at an antenna array, whereby the echo pulses are received as a function of transmitted signals being reflected off such objects/features as moving targets, stationary targets, terrain, natural features, manmade features, etc. The transmitted signals form part of a steered beam, which as previously described, the transmitted signals can be generated and/or modified in conjunction with a DDS component (e.g., either a physical component(s) or a virtual component(s)) to enable the transmitted signals to be respectively time delayed, phase shifted, and/or amplitude adjusted as required to form a steered beam. DDS can be applied to a transmittable signal prior to conversion from IF to RF.

At 2520, the one or more echo pulses can be frequency converted from RF to IF, whereby the frequency conversion can be performed by one or more mixers.

At 2530, the one or more echo pulses can be received in analog format. Accordingly, to enable processing of the one or more echo pulses, the one or more echo pulses can be converted from analog format to digital format, e.g., by an ADC.

At 2540, the one or more echo pulses can be processed to enable target determination, etc. The one or more echo pulses can be processed in accordance with information, parameters, etc., utilized during the formation of the one or more echo pulses for transmission. The processing can be in accordance with knowledge of how the one or more echo pulses were generated and/or modified during a DDS operation(s) utilized during formation of the one or more echo pulses. The processing can also be performed in conjunction with knowledge of how the transmitted signals were formed in accordance with a beam steering algorithm. In an embodiment, processing of the one or more echo pulses can be performed by a processor utilizing DDS and the beam steering algorithm.

In an embodiment, initiation of transmission of the first RF signal and the second RF signal can be at the same turn-on time. Hence, even though the second RF signal may have a different initial phase relative to an initial phase of the first RF signal, the difference in phase can be considered equivalent to a timing delay required to enable the constructive and destructive interference such that the beam is steered towards the direction of interest.

As previously described, the various embodiments owing to IF signals being typically lower in frequency than RF signals, generation, transmission, reception, and processing of IF signals may be implemented by mixed-signal means via DACs and/or DDS, ordinary transmission lines, ADCs, and digital signal processors (DSPs), respectively. By placing all of the complexity and difficulty associated with beam steering in the IF subsystem at lower frequencies, modern commercial off-the-shelf (COTS) digital hardware may be utilized, with according reductions in system weight, power, size, and cost (e.g., as a function of Moore's law). An IF subsystem can be integrated with compatible RF antenna-array frontends to accommodate any radar or communications band, with essentially no change to the underlying hardware, enabling achievement of component commonality among disparate systems. Hence, IF subsystems (e.g., the IF portion of system 100) can be interchangeable having more IF channels, wider bandwidths, lower power, and/or smaller footprint.

Per the various embodiments herein, the relocation of beam steering responsibilities from RF to IF eliminates a requirement to utilize broadband analog phase shifters (APS) and/or true-time-delay (TTD) devices at RF for each antenna element or sub-array of antenna elements. This enables RF electronics associated with a single antenna element to better fit inside the space of $(\lambda_0/2)^2$ to avoid the onset of grating lobes during scan, where $\lambda_0$ is the shortest free-space wavelength of radiation. By configuring beam steering at IF, functionality of an antenna array can be reduced to distributed amplification, polarization selection, element-wise frequency up/down conversion and IF/LO feed distribution necessary for radiation and reception at RF. For low frequency applications such as weather and search radars where IF may be directly radiated, analog frequency conversion may be avoided. Furthermore, if single-sideband (SSB) RF suppression is desired, in-phase and quadrature (IQ) frequency conversion may be utilized in place of RF image-rejection filters.

It is to be appreciated that while systems 100, 1600 and 2100 present various configurations, one or more components or devices included in a particular configuration can be included in any of the configurations, and is not just limited to a configuration in which it is illustrated herein.

Figure 26:
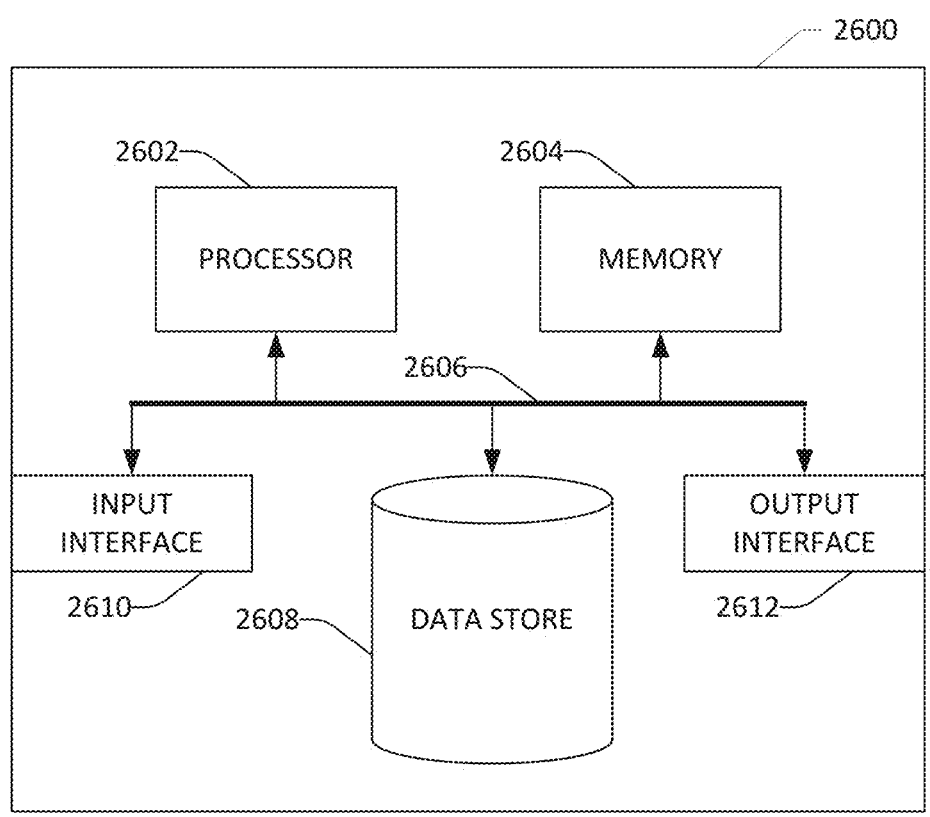
FIG. 26 illustrates an exemplary computing device.

Referring now to FIG. 26, a high-level illustration of an exemplary computing device 2600 that can be used in accordance with the systems and methodologies disclosed herein is illustrated. For instance, the computing device 2600 may be utilized to control measurement and determination of mutual coupling that exists between a plurality of antenna pairings in a phased array antenna. For example, computing device 2600 can operate as a controller 112 operating in conjunction with a beam steering algorithm 196. The computing device 2600 includes at least one processor 2602 that executes instructions that are stored in a memory 2604. The instructions may be, for instance, instructions for implementing functionality described as being carried out by one or more components discussed above or instructions for implementing one or more of the methods described above. The processor 2602 may access the memory 2604 by way of a system bus 2606. In addition to storing executable instructions, the memory 2604 may also store operating parameters, required operating parameters, and on forth.

The computing device 2600 additionally includes a data store 2608 that is accessible by the processor 2602 by way of the system bus 2606. The data store 2608 may include executable instructions, operating parameters, required operating parameters, etc. The computing device 2600 also includes an input interface 2610 that allows external devices to communicate with the computing device 2600. For instance, the input interface 2610 may be used to receive instructions from an external computer device, from a user, etc. The computing device 2600 also includes an output interface 2612 that interfaces the computing device 2600 with one or more external devices. For example, the computing device 2600 may display text, images, etc., by way of the output interface 2612.

Additionally, while illustrated as a single system, it is to be understood that the computing device 2600 may be a distributed system. Thus, for instance, several devices may be in communication by way of a network connection and may collectively perform tasks described as being performed by the computing device 2600.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. The terms "component" and "system" are also intended to encompass hardware configured to cause certain functionality to be performed, where such hardware can include, but is not limited to including, Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

What has been described above includes examples of one or more embodiments. It is, of course, not possible to describe every conceivable modification and alteration of the above structures or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. An array antenna, comprising:
   a first mixer, the first mixer is located on a first channel and is configured with a first intermediate frequency (IF) input port, a first local oscillator (LO) input port, and a first radio frequency (RF) output port, the first mixer configured to output an RF signal at the RF output port based upon a first IF signal received at the first IF input port and an oscillator signal received at the first LO input port;
   a wave generator, wherein the wave generator comprises a direct digital synthesis (DDS) component, the DDS component utilizes a true-time-delay (TTD) component to generate the first IF signal with a first time delay, the first time delay of the first IF signal causes a time delay in the first RF signal, wherein the time delay of the first RF signal is in accordance with an output from a beam steering algorithm; and
   an analog-to-digital converter (ADC) configured to receive an analog echo pulse and convert the analog echo pulse to a digital echo pulse, and wherein the controller component is configured to utilize the DDS component to process the digital echo pulse.

2. The array antenna of claim 1, wherein the DDS component further comprises a first phase component, wherein the first phase component applies a first phase shift to the first IF signal to phase shift the first RF signal in accordance with the output of the beam steering algorithm.

3. The array antenna of claim 2, wherein the timing of the first RF signal is delayed relative to a timing of a reference RF signal and further the phase of the first RF signal is shifted relative to a phase of the reference RF signal.

4. The array antenna of claim 2, further comprising:
   a second mixer, the second mixer is located on a second channel and is configured with a second IF input port, a second LO input port, and a second RF output port, the second mixer configured to output a second RF signal at the second RF output port based upon a second IF signal received at the second IF input port and the oscillator signal received at the second LO input port; and
   the DDS component is further configured to generate the second IF signal on the second channel, the second IF signal is generated with a second time delay and a second phase shift, the second time delay causes a delay in the second RF signal and the second phase shift causes a phase shift in the second RF signal, the delay and phase shift of the second RF signal is in accordance with the beam steering algorithm.

5. The array antenna of claim 4, wherein the wave generator is configured to generate the first IF signal on the first channel and the second IF signal on the second channel.

6. The array antenna of claim 4, further comprising a first antenna element located on the first channel and connected to the first mixer via the first RF output port, the first antenna element configured to emit a first transmitted signal based upon the first RF signal, and a second antenna element located on the second channel and connected to the second mixer via the second RF output port, the second antenna element configured to emit a second transmitted signal based upon the second RF signal.

7. The array antenna of claim 4, further comprising a controller component, the controller component configured to determine the timing and phase of the first RF signal relative to the timing and phase of the second RF signal, such that upon transmission, the first transmitted signal and the second transmitted signal combine to form a beam, wherein the timing and phase of the first RF signal interferes with the timing and phase of the second RF signal to cause the beam to be steered in a particular direction relative to a boresight of the array antenna.

8. The array antenna of claim 7, wherein the controller component utilizes the beam steering algorithm to determine the timing and phase of the first RF signal relative to the timing and phase of the second RF signal.

9. The array antenna of claim 4, further comprising a LO connected to the first mixer via the first LO input port, and connected to the second mixer via the second LO input port, wherein the LO generates the oscillator signal.

10. The array antenna of claim 2, wherein a magnitude of the phase shift of the first IF signal is equivalent to a magnitude of a time delay applied to a LO connected to the first LO input port of the first mixer, wherein the magnitude of the time delay applied to the IF is the same as the magnitude of the time delay required of the first RF signal.

11. A method comprising:
time delaying and phase shifting a first signal having an intermediate frequency (IF), wherein the time delaying and phase shifting the first IF signal is performed prior to up-converting the first IF signal to form a first radio frequency (RF) signal, wherein a magnitude of the time delay is relative to a timing of a reference RF signal and a magnitude of the phase shift is relative to a phase of a reference local oscillator (LO) signal;
transmitting the first RF signal via a first antenna element of an antenna array;
transmitting the reference RF signal via a second antenna element of the antenna array, wherein transmission turn-on of the first RF signal and the reference RF signal are simultaneous;
time delaying and phase shifting a second signal having an intermediate frequency (IF); wherein the time delaying and phase shifting the second IF signal is performed prior to up-converting the second IF signal to form a second RF signal, wherein a magnitude of the time delay is relative to a timing of the first RF signal and a magnitude of the phase shift is relative to a phase of the first RF signal; and
transmitting the second RF signal via a second antenna element of an antenna array, wherein transmission turn-on of the second RF signal is simultaneous with the transmission turn-on of the first RF signal and the reference RF signal.

12. The method of claim 11, wherein, upon transmission, the first RF signal and the reference RF signal interfere to form a steered beam, wherein the beam is steered in a direction dependent upon respective amplitudes formed by the time delaying and phase shifting of the first RF signal relative to amplitudes in the reference RF signal.

13. The method of claim 11, further comprising:
determining a direction in which the beam is to be steered; and
determining the time delay and phase shift of the first IF signal, the time delay and phase shift of the second IF signal, and a time delay and phase shift of the reference signal, to enable the beam to be steered in the direction.

14. The method of claim 13, wherein the time delay of the reference beam is zero, and the phase shift of the reference beam is zero.

15. The method of claim 11, further comprising:
frequency-converting, at a first mixer, the first IF signal to the first RF signal; and
frequency-converting, at a second mixer, a reference IF signal to form the reference RF signal, wherein the first mixer and the second mixer perform the frequency-converting of the first IF waveform and the frequency-converting of the second IF waveform based upon a common signal received from a local oscillator.

16. A non-transitory computer-readable storage medium comprising instructions that, when executed by a processor, cause the processor to perform acts comprising:
determining a direction to steer a beam, wherein the beam is formed by a plurality of antenna elements in an antenna array;
determining a first timing and a first phase of a first RF signal;
determining a second timing and a second phase of a second RF signal, wherein the first RF signal and second RF signal combine to form the steered beam;
determining a first timing delay and a first phase shift to generate a first IF signal to form the first RF signal having the determined first timing and the first phase;
generating the first IF signal on a first channel of the antenna array, the first IF signal having the first timing delay and the first phase shift;
converting the first IF signal to form the first RF signal, the first RF signal is on the first channel of the array antenna;
determining a second timing delay and a second phase shift to generate a second IF signal to form the second RF signal having the determined second timing and the second phase;
generating the second IF signal on a second channel of the antenna array, the second IF signal having the second timing delay and the second phase shift; and
converting the second IF signal to form the second RF signal, the second RF signal is on the second channel of the array antenna.

17. The non-transitory computer-readable storage medium of claim 16, wherein:
the first IF signal and the second IF signal are generated by direct digital synthesis at an arbitrary waveform generator (AWG), wherein the first IF signal is generated having the first timing delay and the first phase shift and the second IF signal is generated having the second timing delay and the second phase shift, and at least one of the first IF signal or the second IF signal can be generated with amplitude weighting.

18. The computer-readable storage medium of claim 16, wherein the first RF signal and the second RF signal have a frequency range >0 Hz.

* * * * *